US010580049B2

(12) United States Patent
Graylin

(10) Patent No.: US 10,580,049 B2
(45) Date of Patent: Mar. 3, 2020

(54) SYSTEM AND METHOD FOR INCORPORATING ONE-TIME TOKENS, COUPONS, AND REWARD SYSTEMS INTO MERCHANT POINT OF SALE CHECKOUT SYSTEMS

(71) Applicant: ROAM DATA INC., Boston, MA (US)

(72) Inventor: Will W. Graylin, Saugus, MA (US)

(73) Assignee: INGENICO, INC., Alpharetta, GA (US)

( * ) Notice: Subject to any disclaimer, the term of this patent is extended or adjusted under 35 U.S.C. 154(b) by 378 days.

(21) Appl. No.: 13/663,561

(22) Filed: Oct. 30, 2012

(65) Prior Publication Data

US 2013/0054336 A1 Feb. 28, 2013

Related U.S. Application Data

(63) Continuation-in-part of application No. 13/080,047, filed on Apr. 5, 2011, now abandoned.
(Continued)

(51) Int. Cl.
*G06Q 30/06* (2012.01)
*G06Q 40/02* (2012.01)
(Continued)

(52) U.S. Cl.
CPC .......... *G06Q 30/06* (2013.01); *G06Q 20/322* (2013.01); *G06Q 20/4016* (2013.01);
(Continued)

(58) Field of Classification Search
None
See application file for complete search history.

(56) References Cited

U.S. PATENT DOCUMENTS 5,739,512 A 4/1998 Tognazzini
6,748,367 B1 * 6/2004 Lee .................................. 705/66
(Continued)

FOREIGN PATENT DOCUMENTS

JP 2007094826 A 4/2007
KR 1020020066709 A 8/2002
(Continued)

OTHER PUBLICATIONS

Anonymous, Mocapay Unveils Secure Mobile Payments at Merchant POS, Feb. 23, 2010, Business Wire, p. 1. (Year: 2010).*
(Continued)

*Primary Examiner* — Jason B Dunham
*Assistant Examiner* — Brittany E Bargeon
(74) *Attorney, Agent, or Firm* — Ohlandt, Greeley, Ruggiero & Perle, L.L.P.

(57) ABSTRACT

A method for incorporating one-time-tokens, coupon and reward systems in conjunction with merchants' POS checkout systems in the physical or virtual environments includes providing a consumer computing device comprising an electronic wallet application, providing a One-time Token Redemption System (OTRS) and user electronic wallet accounts, logging into a user electronic wallet account through the electronic wallet application, sending a request for a one-time token valid for a specified time interval and then forwarding the request for the one-time token to the OTRS and upon approval sending the requested one-time token from the OTRS to the electronic wallet application. Next, presenting and entering the one-time token into a merchant point of sale checkout system within the specified time interval via the consumer computing device, sending the entered one-time token to a checkout application, and then processing payment via a secure payment application.

7 Claims, 21 Drawing Sheets

Related U.S. Application Data

(60) Provisional application No. 61/553,653, filed on Oct. 31, 2011.

(51) Int. Cl.
  *G06Q 20/32* (2012.01)
  *G06Q 30/02* (2012.01)
  *G06Q 30/04* (2012.01)
  *G06Q 20/40* (2012.01)
  *H04L 29/08* (2006.01)
  *H04L 29/06* (2006.01)

(52) U.S. Cl.
  CPC ......... *G06Q 30/02* (2013.01); *G06Q 30/0201* (2013.01); *G06Q 30/0207* (2013.01); *G06Q 30/04* (2013.01); *G06Q 30/0603* (2013.01); *G06Q 30/0613* (2013.01); *G06Q 40/02* (2013.01); *H04L 67/02* (2013.01); *H04L 63/0823* (2013.01); *H04L 63/0838* (2013.01); *H04L 63/168* (2013.01)

(56) References Cited

U.S. PATENT DOCUMENTS

| | | | |
|---|---|---|---|
| 6,804,627 B1 | 10/2004 | Marokhovsky et al. | |
| 6,954,735 B1 | 10/2005 | Djupsjobacka et al. | |
| 7,266,511 B2 | 9/2007 | Teshima | |
| 7,480,631 B1 | 1/2009 | Merced et al. | |
| 7,797,192 B2 | 9/2010 | Mitchell et al. | |
| 7,809,169 B2 | 10/2010 | Martinez | |
| 7,866,553 B2 | 1/2011 | Liu et al. | |
| 8,600,855 B2 | 12/2013 | Winters et al. | |
| 2001/0014878 A1* | 8/2001 | Mitra | G06Q 20/10 705/39 |
| 2002/0161638 A1 | 10/2002 | Ogawa | |
| 2003/0055792 A1 | 3/2003 | Kinoshita et al. | |
| 2003/0084301 A1 | 5/2003 | Krawetz | |
| 2003/0216983 A1 | 11/2003 | Bodin | |
| 2003/0217000 A1 | 11/2003 | Wichman | |
| 2004/0133787 A1 | 7/2004 | Doughty et al. | |
| 2004/0162880 A1* | 8/2004 | Arnone | H04L 12/1895 709/206 |
| 2004/0210498 A1* | 10/2004 | Freund | 705/30 |
| 2004/0225567 A1 | 11/2004 | Mitchell et al. | |
| 2004/0230490 A1 | 11/2004 | Barsade et al. | |
| 2004/0230525 A1 | 11/2004 | Barsade et al. | |
| 2004/0243520 A1* | 12/2004 | Bishop | G06Q 20/341 705/75 |
| 2004/0254896 A1 | 12/2004 | Barsade et al. | |
| 2005/0087598 A1 | 4/2005 | Yamanaka | |
| 2005/0131837 A1 | 6/2005 | Sanctis et al. | |
| 2005/0165651 A1 | 7/2005 | Mohan | |
| 2005/0222961 A1* | 10/2005 | Staib | G06Q 20/327 705/64 |
| 2005/0246278 A1 | 11/2005 | Gerber et al. | |
| 2006/0111967 A1 | 5/2006 | Forbes | |
| 2006/0160487 A1 | 7/2006 | Nam et al. | |
| 2006/0180664 A1* | 8/2006 | Barrett | G06Q 20/32 235/383 |
| 2006/0206709 A1* | 9/2006 | Labrou et al. | 713/167 |
| 2007/0005511 A1 | 1/2007 | Martinez | |
| 2007/0069013 A1 | 3/2007 | Seifert et al. | |
| 2007/0075133 A1 | 4/2007 | Yeager | |
| 2007/0094088 A1 | 4/2007 | Mastie et al. | |
| 2007/0130463 A1 | 6/2007 | Law et al. | |
| 2007/0131759 A1 | 6/2007 | Cox et al. | |
| 2007/0192178 A1 | 8/2007 | Fung et al. | |
| 2007/0192294 A1 | 8/2007 | Ramer et al. | |
| 2007/0271144 A1 | 11/2007 | Winquist | |
| 2008/0071638 A1 | 3/2008 | Winquist | |
| 2008/0126260 A1 | 5/2008 | Cox et al. | |
| 2008/0195499 A1* | 8/2008 | Meredith et al. | 705/26 |
| 2008/0245851 A1 | 10/2008 | Kowalski | |
| 2008/0294538 A1 | 11/2008 | Barsade et al. | |
| 2009/0024471 A1 | 1/2009 | Nielson et al. | |
| 2009/0037291 A1 | 2/2009 | Dawson et al. | |
| 2009/0144164 A1 | 6/2009 | Wane et al. | |
| 2009/0144456 A1 | 6/2009 | Gelf et al. | |
| 2009/0233579 A1 | 9/2009 | Castell et al. | |
| 2009/0234773 A1 | 9/2009 | Hasson | |
| 2009/0248548 A1 | 10/2009 | Obermeyer | |
| 2009/0307067 A1 | 12/2009 | Obermeyer | |
| 2009/0307132 A1 | 12/2009 | Phillips | |
| 2010/0010905 A1 | 1/2010 | Arzumanyan et al. | |
| 2010/0010908 A1 | 1/2010 | Pasupulati et al. | |
| 2010/0023449 A1 | 1/2010 | Skowronek | |
| 2010/0048247 A1 | 2/2010 | Marikson | |
| 2010/0057557 A1 | 3/2010 | Yoo | |
| 2010/0070375 A1 | 3/2010 | Lane et al. | |
| 2010/0138344 A1 | 6/2010 | Wong et al. | |
| 2010/0161466 A1 | 6/2010 | Gilder | |
| 2010/0217707 A1 | 8/2010 | Philips | |
| 2010/0276484 A1* | 11/2010 | Banerjee | G06Q 30/06 235/379 |
| 2010/0299212 A1 | 11/2010 | Graylin et al. | |
| 2011/0040640 A1 | 2/2011 | Erikson | |
| 2011/0084139 A1 | 4/2011 | McKelvey et al. | |
| 2011/0153496 A1 | 6/2011 | Royyuru | |
| 2011/0218911 A1 | 9/2011 | Spodax | |
| 2011/0238473 A1 | 9/2011 | Sankolli et al. | |
| 2011/0312270 A1 | 12/2011 | White | |
| 2012/0028609 A1* | 2/2012 | Hruska | 455/411 |
| 2012/0099780 A1* | 4/2012 | Smith et al. | 382/136 |
| 2012/0265631 A1* | 10/2012 | Cronic | G06Q 20/0855 705/26.1 |

FOREIGN PATENT DOCUMENTS

| | | |
|---|---|---|
| KR | 1020020064473 A | 9/2002 |
| KR | 10-2007-0016893 A | 2/2007 |
| KR | 10-2011-0006732 A | 1/2011 |
| KR | 10-1080306 B1 | 11/2011 |
| WO | 02-05152 A1 | 1/2002 |
| WO | 2010111130 A2 | 9/2010 |
| WO | 2010129332 A1 | 11/2010 |

OTHER PUBLICATIONS http://www.skava.net/home/index.php?option=com_wrapper&view=wrapper&Itemid=39/.
Kats, Rimma, "My Mall app lets consumers create personalized shopping mall", Mobile Commerce Daily, Apr. 13, 2010, http://www.mobilecommercedaily.com/my-mall-lets-consumers-create-their-own-personalized-shopping-mall-with-new-app/.
http://www.digby.com/.
Dolcourt, Jessica, "Digby: Impulse shopping app for BlackBerry", CNET Reviews, Oct. 23, 2007, http://reviews.cnet.com/8301-12261_7-9802381-51.html.
http://www.amazon.com/gp/help/customer/display.html/ref=ms_sbrspot_3/180-4647531-9101311?ie=UTF8&nodeId=200287200&ie=UTF8&pf_rd_p=465562731&pf_rd_s=center-2&pf_rd_t=1401&pf_rd_i=1000291661&pf_rd_m=ATVPDKIKX0DER&pf_rd_r=1A0KNMJM7R5HZR7659KA.
International Preliminary Examination Report on Patentability dated May 15, 2014 from PCT/US2012/062645, 7 pages.
International Search Report dated May 8, 2013 for corresponding International PCT Application No. PCT/US2013/024578, 3.
International Written Opinion dated May 8, 2013 for corresponding International PCT Application No. PCT/US2013/024578, 4 pages.
International Search Report dated Mar. 28, 2013 for corresponding International PCT Application No. PCT/US2012/062645, 3 pages.
International Written Opinion dated Mar. 28, 2013 for corresponding International PCT Application No. PCT/US2012/062645, 5 pages.
European Communication dated Aug. 12, 2012 for corresponding European Patent Application No. 10841410.3, 2 pages.
International Preliminary Report on Patentability dated Jul. 4, 2012 for corresponding International PCT Application No. PCT/US2010/044638.

(56) References Cited

OTHER PUBLICATIONS

International Search Report dated May 1, 2012 for corresponding International PCT Application No. PCT/US2011/031323, 4 pages.
International Written Opinion dated May 1, 2012 for corresponding International PCT Application No. PCT/US2011/031323, 5 pages.
International Search Report dated Jan. 27, 2011 for corresponding International PCT Application No. PCT/US2010/044638, 3 pages.
International Written Opinion dated Jan. 27, 2011 for corresponding International PCT Application No. PCTUS/2010/044638, 3 pages.
Supplementary European Search Report dated Sep. 11, 2015 from corresponding Application No. 13743780.2, 7 pages.
European Search Report dated Aug. 7, 2015 from corresponding International Application No. EP13743780, 5 pages.
"NFC-Dongle" Add-on Package, XP-002541672, Jun. 18, 2008 (Internet Citation), 2 pages.
Australian Patent Examination Report No. 1 dated Jan. 25, 2016 from corresponding Australian Patent Application No. 2010337356, 4 pages.
European Search Report dated Sep. 28, 2015 from corresponding European Patent Application No. 12844813.1, 7 pages.
Chinese Second Office Action dated Dec. 29, 2015 from corresponding Chinese Patent Application No. 201080064292.5, 7 pages.
European Search Report dated Oct. 15, 2015 from corresponding European Patent Application No. 12844813.1, 8 pages.
European Search Report dated Sep. 6, 2018 from corresponding European Patent Application No. 12 844 813.1, 9 pages.
European Search Report dated Jun. 24, 2019 from corresponding European Patent Application No. 13 743 780.2, 9 pages.

\* cited by examiner

SYSTEM AND METHOD FOR INCORPORATING ONE-TIME TOKENS, COUPONS, AND REWARD SYSTEMS INTO MERCHANT POINT OF SALE CHECKOUT SYSTEMS

CROSS REFERENCE TO RELATED CO-PENDING APPLICATIONS

This application claims the benefit of U.S. provisional application Ser. No. 61/553,653 filed on Oct. 31, 2011 and entitled SYSTEM AND METHOD FOR INCORPORATING ONE-TIME TOKENS, COUPONS, AND REWARD SYSTEMS INTO MERCHANT POINT OF SALE CHECKOUT SYSTEMS, which is commonly assigned and the contents of which are expressly incorporated herein by reference.

This application is also a continuation in part of U.S. application Ser. No. 13/080,047 filed on Apr. 5, 2011 and entitled SYSTEM AND METHOD FOR CHECKOUT AND CUSTOMER DATA CAPTURE IN COMMERCE APPLICATIONS, which is commonly assigned and the contents of which are expressly incorporated herein by reference.

FIELD OF THE INVENTION

The present invention relates to a system and a method for incorporating one-time-tokens, coupon and reward redemption systems into merchant point-of-sale (POS) checkout systems, in both the physical and virtual environments.

BACKGROUND OF THE INVENTION

Traditional third party coupon/rewards redemption systems such as, Groupon, In Living Social, and other systems, are separated from the payment applications at the Point-of-Sale (POS) device. Coupons offered by these systems are often entered manually. This makes it difficult for merchants to redeem such coupons or rewards and harder to track customer data and usage by both the merchant and the coupon provider. The identity of the user of the coupon is not tied to the individual's payment data, nor is it obtained at all in many cases, making it difficult for the merchant to track their customers' habits and promote to them directly in the future.

A real time integrated payment and third party coupon/rewards redemption system would be desirable in order to enable third parties to drive traffic to merchants while being tied to the POS systems of the existing merchants. This system would ease the checkout process for consumers and merchants, reduce fraud, and provide customer buying preferences to the merchants for future promotions.

SUMMARY OF THE INVENTION

The present invention relates to a system and a method for incorporating one-time-tokens, coupon and reward systems into merchant POS checkout systems in the physical and/or virtual environments, for more convenient checkout experience for buyers, and more secure and informative transaction for sellers, and more data for the coupon/rewards providers.

In general, in one aspect the invention features a method for using one-time tokens for completing a purchase transaction at a merchant point of sale checkout system. The method includes the following steps. First, providing a consumer computing device comprising an electronic wallet application. Next, providing a One-time Token Redemption System (OTRS) and user electronic wallet accounts. The consumer computing device accesses the OTRS and the user electronic wallet accounts via a network connection. Next, logging into a user electronic wallet account through the electronic wallet application. Next, sending a request to the user electronic wallet account for a one-time token valid for a specified time interval and then forwarding the request for the one-time token to the OTRS and upon approval sending the requested one-time token from the OTRS to the electronic wallet application in the consumer computing device. Next, presenting and entering the one-time token into a merchant point of sale checkout system within the specified time interval via the consumer computing device. Next, sending the entered one-time token to a checkout application, and then processing payment via a secure payment application.

Implementations of this aspect of the invention may include one or more of the following features. The one-time token is linked to a specific payment instrument stored in the user electronic wallet account and the payment is processed using the specific payment instrument. The logging includes authenticating a user with a secure personal identification number (PIN). The method further includes receiving confirmation of payment and completing the purchase transaction. The method further includes providing a coupon and rewards offer system and the OTRS communicates with the coupon and rewards offer system and checks the validity of presented coupons. The OTRS includes a host system, an Application Programming Interface (API), a redemption application, and a validity check application. The API is configured to allow the coupon and rewards offer system to tie to the redemption application. The method further includes providing a commerce gateway server comprising the checkout application, the secure payment application, the OTRS and the user electronic wallet accounts. The secure payment application comprises the user electronic wallet accounts and the user electronic wallet accounts store payment instrument data, fulfillment data, demographics, loyalty information, and transaction history. The consumer computing device may be one of mobile phone, PDA, payment module, portable computer, personal computer, set-top box, netbook, tablets, iPad, electronic reader, or an Internet appliance.

In general, in another aspect the invention features a method for using coupons and reward points for completing a purchase transaction at a merchant point of sale checkout system. The method includes the following steps. First, providing a One-time Token Redemption System (OTRS), and a coupon and reward offer system. Next, presenting a coupon and entering coupon information into a merchant point of sale checkout system. Next, sending a request for payment via the coupon to the OTRS. Next, checking the validity of the coupon by the OTRS and upon receiving confirmation of the coupon validity sending the entered coupon information to a checkout application, and processing payment with the coupon via a secure payment application.

Implementations of this aspect of the invention may include one or more of the following features. The OTRS checks the validity of the coupon by accessing the coupon and reward offer system. The OTRS checks the validity of the coupon by accessing a database storing copies of coupons issued by the coupon and reward offer system. The method further includes marking the coupon as "used" after the payment is processed. The coupon information is entered by scanning a paper coupon or manually. The method further includes providing a consumer computing device and storing the coupon information in the consumer computing device. The coupon information is transmitted electronically to the merchant point of sale checkout system. The method further includes providing user electronic wallet accounts and storing the coupon information in a user electronic wallet account. The coupon information is transmitted electronically to the merchant point of sale checkout system. The OTRS includes a host system, an Application Programming Interface (API), a redemption application, and a validity check application. The API is configured to allow the coupon and reward offer system to tie to the redemption application. The consumer computing device may be one of mobile phone, PDA, payment module, portable computer, personal computer, set-top box, netbook, tablets, iPad, electronic reader, or an Internet appliance.

In general, in another aspect the invention features a system for completing a purchase transaction at a merchant point of sale checkout system with one-time tokens including a consumer computing device comprising an electronic wallet application, a One-time Token Redemption System (OTRS) and user electronic wallet accounts, a checkout application, a secure payment application, means for logging into a user electronic wallet account through the electronic wallet application, means for sending a request to the user electronic wallet account for a one-time token valid for a specified time interval, means for forwarding the request for the one-time token to the OTRS and upon approval sending the requested one-time token from the OTRS to the electronic wallet application in the consumer computing device, means for presenting and entering the one-time token into a merchant point of sale checkout system within the specified time interval via the consumer computing device, means for sending the entered one-time token to the checkout application and means for processing payment via the secure payment application. The consumer computing device accesses the OTRS and the user electronic wallet accounts via a network connection.

In general, in another aspect the invention features a system for completing a purchase transaction at a merchant point of sale checkout system with coupons and reward points including a One-time Token Redemption System (OTRS), and a coupon and reward offer system, means for presenting a coupon and entering coupon information into a merchant point of sale checkout system, means for sending a request for payment via the coupon to the OTRS, means for checking the validity of the coupon by the OTRS and upon receiving confirmation of the coupon validity sending the entered coupon information to a checkout application and means for processing payment with the coupon via a secure payment application.

Among the advantages of this invention may be one or more of the following. The invention provides a convenient checkout experience for buyers, and secure and informative transaction for sellers. The invention provides an efficient POS system that is tied to a real time redemption system and reduces the number of steps for sellers to redeem the coupons/rewards, checkout the buyer for payments, and obtain more information about the buyer. This system eases the checkout process for consumers and merchants, reduces fraud, and provides customer buying preferences to the merchants for future promotions. Furthermore, the invention provides an electronic wallet system that is stored in the cloud and is recognized by the POS system for the purposes of paying for purchase transactions with payment instruments stored in the electronic wallet, redeeming any coupons or offers stored in the electronic wallet, and reporting relevant information about the buyer to the seller.

DETAILED DESCRIPTION OF THE INVENTION

Figure 1A:
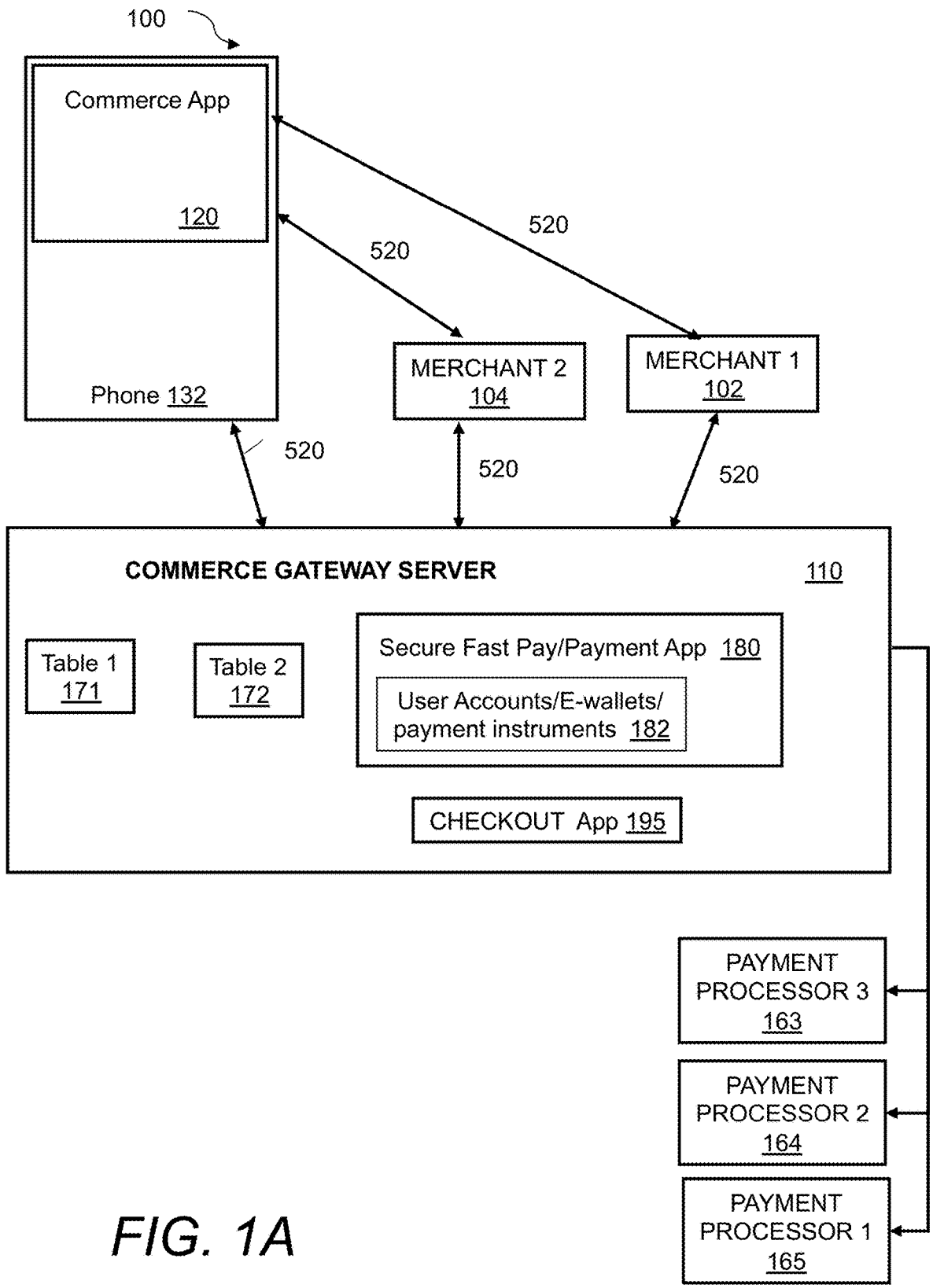
FIG. 1A is an overview diagram of the commerce checkout and data capture system.
Figure 1B:
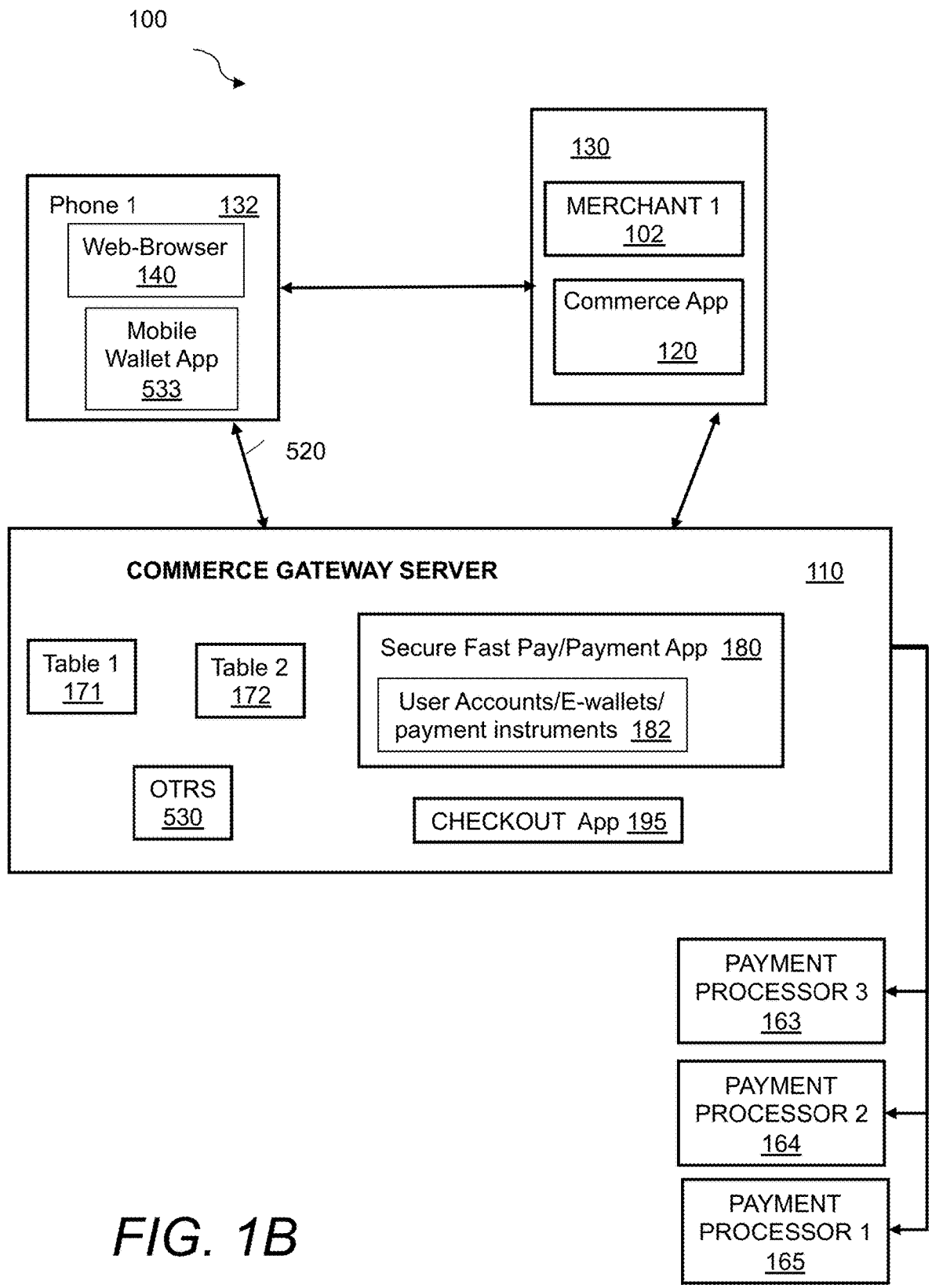
FIG. 1B is an overview diagram of another embodiment of the commerce checkout and data capture system.
Figure 1C:
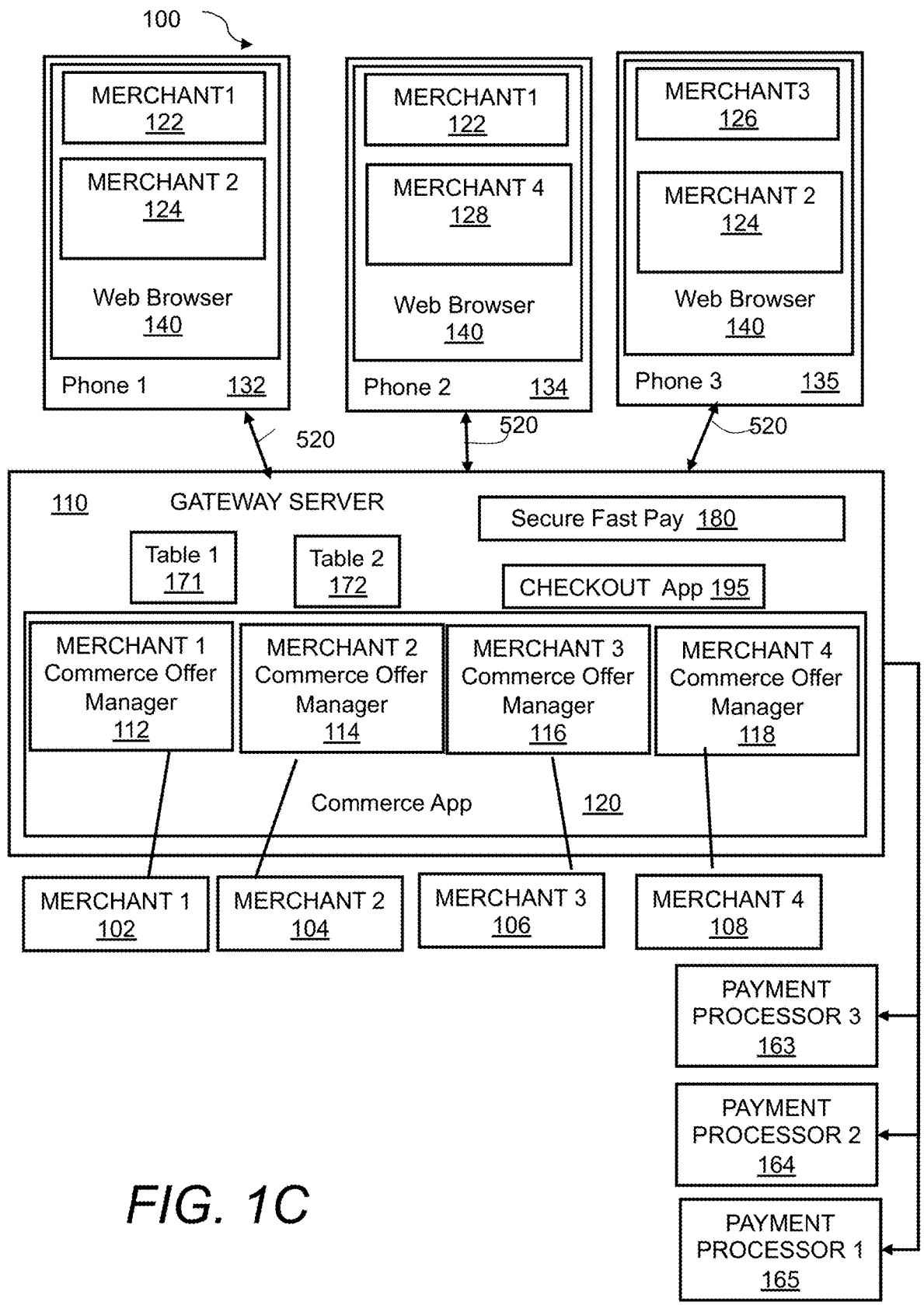
FIG. 1C is an overview diagram of another embodiment of the commerce checkout and data capture system.

Referring to FIG. 1A, a commerce system 100 for providing commerce functionalities to mobile devices includes mobile phone 132 that interacts with a commerce gateway server 110 via network connection 520. The commerce gateway server 110 includes a checkout application 195 and a secure payment application ("Secure Fastpay") 180. The mobile phone 132 includes a commerce application 120 and interacts with merchants 102 and 104 via network connections 520. Merchants 102, 104 also interact with the commerce gateway server via network connections 520. In one example, network connection 520 is the Internet. Merchants 102, 104 present product offers to a consumer on the mobile phone 132 via the commerce application 120. In the embodiment of FIG. 1A, commerce application 120 is a native application that runs on the mobile phone 132. In other embodiments, commerce application 120 is a browser based application running through a web browser 140 on the mobile phone 132. In the embodiment of FIG. 1B, commerce application 120 is a browser based application running on the merchant server 130. In the embodiment of FIG. 1C, commerce application 120 is a browser based application running on the commerce gateway server. In this embodiment merchants 102, 104, 106 and 108 provide product offers to mobile phones 132, 134, 135 via commerce application 120. The presentation of product offerings is managed by commerce offer managers 112, 114, 116 and 118, respectively. In the example of FIG. 1C, the user of phone 1 selected to display storefronts 122, 124, of merchants 1 and 2, respectively. The user of phone 2 selected to have storefronts 122, 128 of merchants 1 and 4, respectively. Similarly, the user of phone 3 selected to have storefronts 126, 124 of merchants 3 and 2, respectively.

Figure 2:
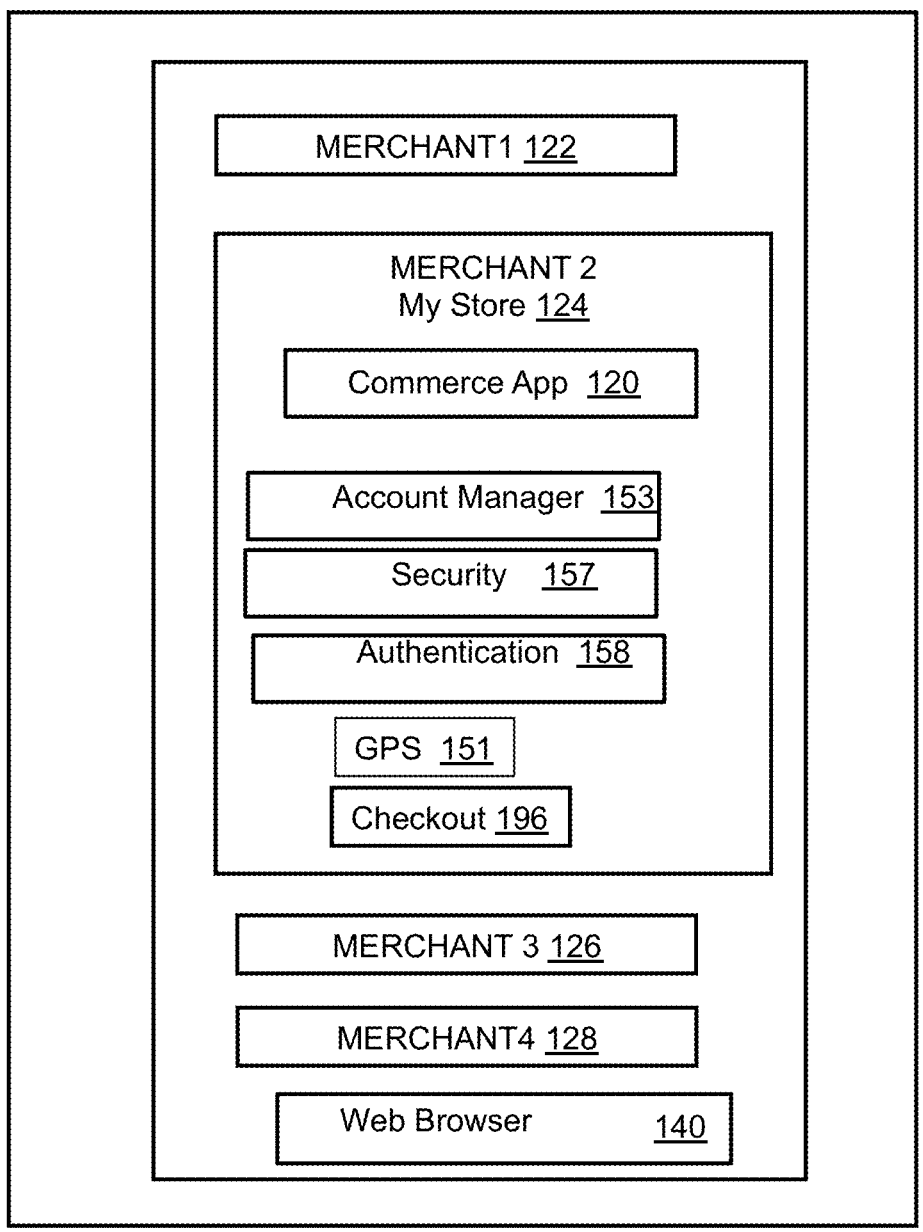
FIG. 2 is a block diagram of the mobile phone applications.

Mobile devices 132, 134, 135 may be any type or format of a mobile device utilizing any type of operating system. Referring to FIG. 2, mobile phone 132 includes in addition to commerce application 120, and web browser 140, an account manager 153, security 157, and authentication 158 data. The account manager 153 manages the details of the account information, such as name, address, shipping information and payment instruments, among others. The authentication data 158 include user name and password, or authentication tokens, or voice or other biometric authentication data. Mobile phone 132 may also include a GPS sensor for providing location information to the commerce gateway server 110. This is an exemplary diagram and therefore the system 100 may include less or more than three mobile devices and less or more than four merchants. Mobile phones 132, 134, 135 belong to consumers that use the devices to perform purchase and payment transactions. The mobile devices 132, 134, 135 may be mobile phones, PC, set top boxes, Net Books, Kindle, and other Internet appliances. The commerce gateway server 110 also connects to payment processors 163, 164, 165 that process payments for the products offered and purchased through the commerce window system 100.

Commerce gateway server 110 is a gateway server, which provides functionality and support of the commerce application 120. In some embodiments, commerce gateway server 110 also delivers product offers to remote terminals 132, 134, 135 and manages these product offers, including the association of the offer with a given product offer ID with a merchant's ID (MID), and to which consumer/user or device (device ID) such an offer goes to. This association of the product ID with the merchant ID and the device ID is stored in Table 1 171, shown in FIG. 1C. Table 1 also stores all merchant IDs, device IDs and product IDs. The MID is also associated with a given payment processor 163, 164, 165. Each payment processor may process different payment instruments and its main job is to authorize payment and deposit funds to the merchant's account if the payment instrument used is valid and has sufficient funds. Table 2 162 stores the payment data information and their associations with the merchant IDs. If the consumer completes the payment transaction via the commerce gateway server, order information, total amount, and payment information are collected by the checkout application 195. Payment information is taken directly from the consumer (i.e. credit card information) each time he/she transacts ("normal pay"). The consumer may also register for "Secure Fastpay" 180, which allows previously used payment instruments to be stored in user accounts or e-wallets 182, and then to be used again quickly with an authentication by the user, as shown in FIG. 1A, FIG. 1B. The payment instrument may be credit cards, prepaid debit cards, PayPal accounts, ACH, among others. The user authentication may be performed via a username and password. In other embodiments, user authentication is based on an authentication token or method, voice or other biometric information. The payment transaction is completed by the payment application 180 by delivering the right payment instrument (stored or new), the right total amount, to the right processor, for the right MID, based on the right offer ID. The commerce gateway server is PCI compliant to properly guard cardholder information securely.

Figure 4:
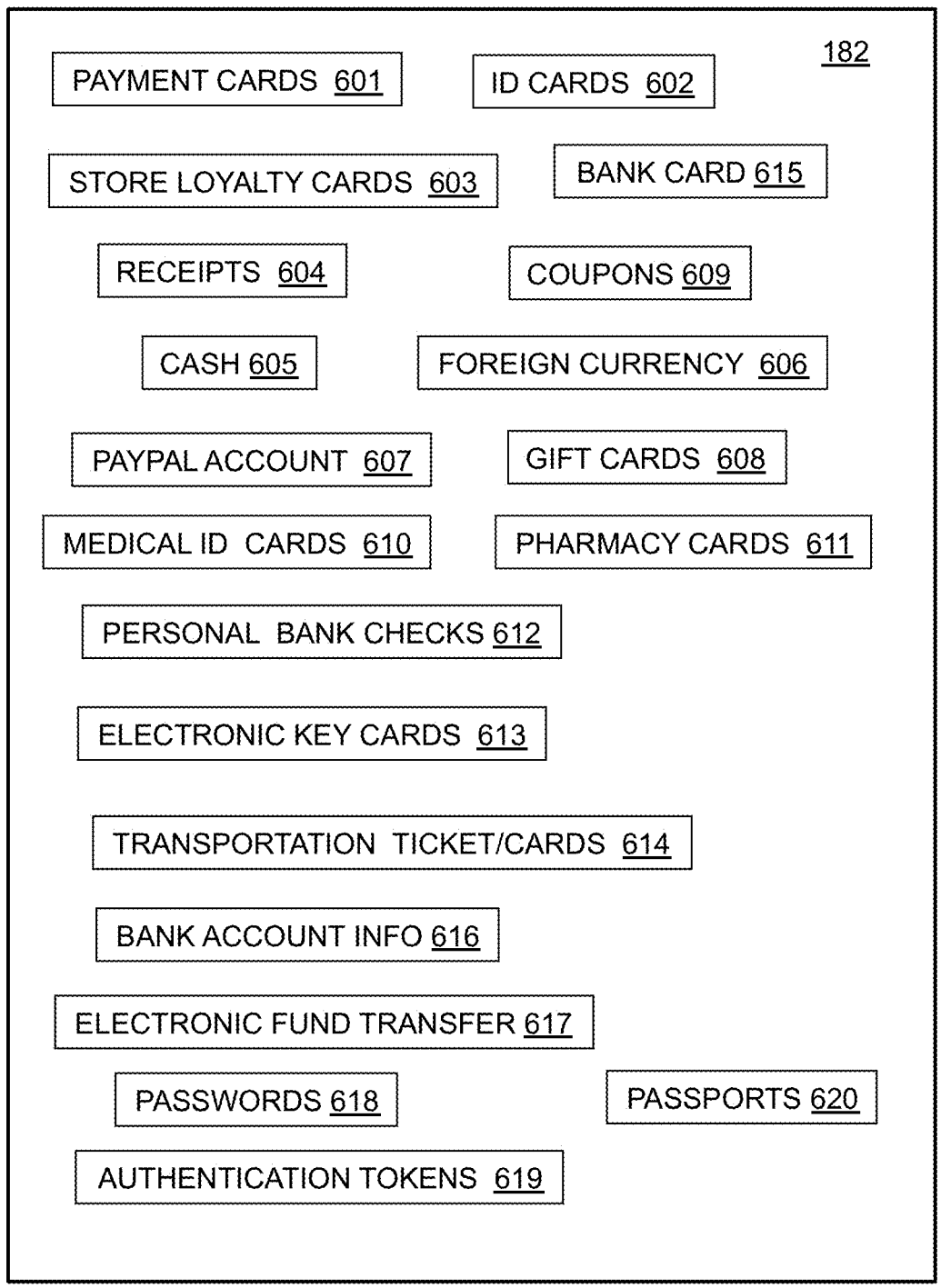
FIG. 4 depicts a block diagram of an electronic wallet used in connection with the commerce checkout systems of FIG. 1A-FIG. 1C.

Referring to FIG. 4, electronic wallet (e-wallet or ROAM wallet) 182 includes a user's payment cards 601, identification cards 602, bank cards, 615, store loyalty cards, 603, receipts 604, coupons 609, cash/currency 605, foreign currency 606, PayPal account information 607, gift cards 608, medical identification cards 610, pharmacy cards 611, personal bank checks 612, electronic key cards 613, transportation tickets, tokens or cards 614, bank account information 616, electronic fund transfer 617, passwords 618, and authentication tokens and markers 619, passport information 620, among others. ROAM wallet 182 is stored in a server 110, which may be a physical server device or cloud-based. The user authentication for accessing the electronic wallet includes name and password, location of the mobile device as verified by a global positioning system (GPS) system, biometric authentication, mobile device ID, camera based authentication, voice authentication, token based authentication, and combinations thereof, among others. In some embodiments, third party authentication is provided that includes verification of user's date of birth, social security number, home address, national ID number, and combinations thereof, among others.

Figure 3:
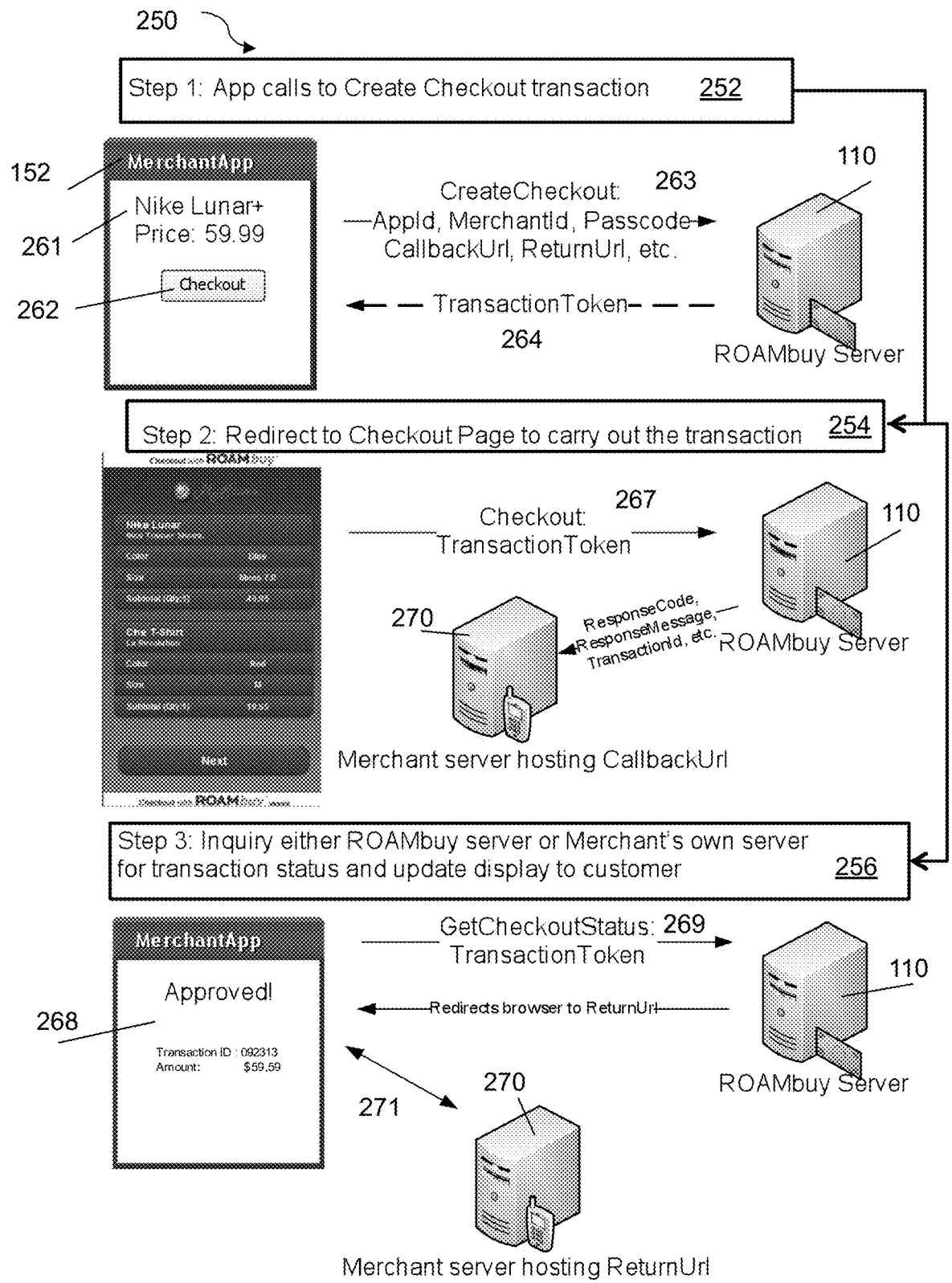
FIG. 3 is a process diagram of a checkout transaction within the commerce checkout systems of FIG. 1A-FIG. 1C.
Figure 5A:
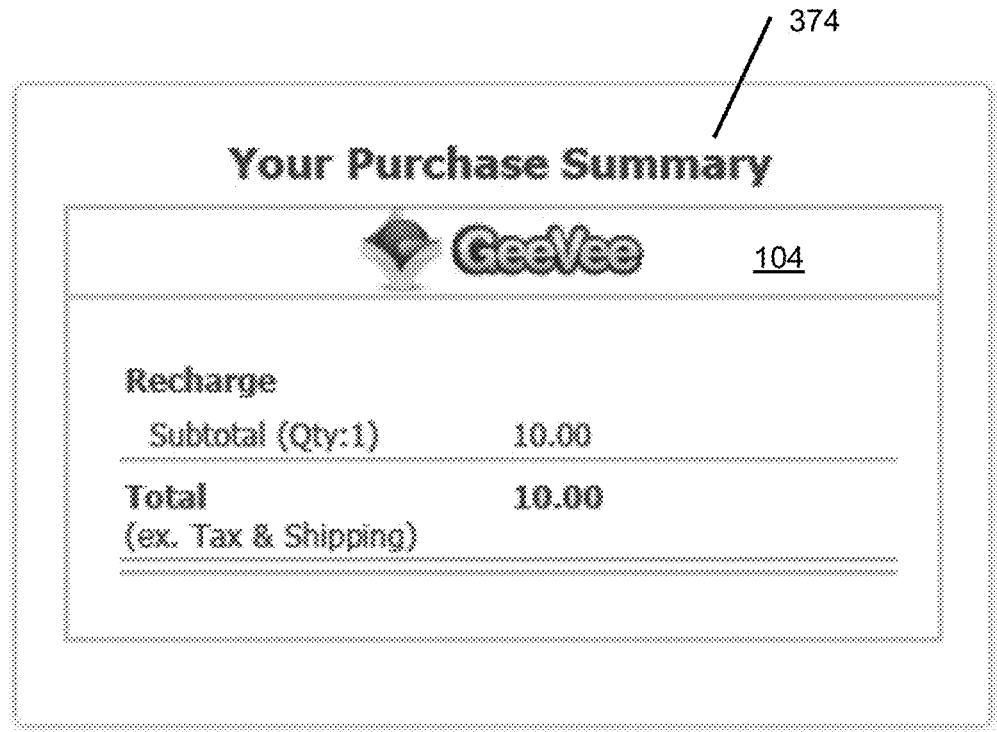
FIG. 5A depicts a screenshot of the payment checkout interface in the commerce checkout systems of FIG. 1A-FIG. 1C providing a purchase summary.

Referring back to FIG. 1A-1C, the commerce gateway server 110 further includes a checkout application 195. Checkout application 195 allows the consumers to use the commerce application 120 in order to complete the checkout process from their mobile native application "My Store" 124. Referring to FIG. 3, the checkout process 250 includes the following steps. In the first step 252, the merchant application 152 sets up the transaction data 261, and calls the checkout application 195 by selecting the checkout tab 262, shown in FIG. 3. In one example, the transaction data include product description, and price, as shown in FIG. 5A. In other examples, the transaction data include all level 3 credit card processing data including transaction amount, date, tax amount, customer code, merchant postal code, tax identification, merchant minority code, merchant state code, ship from postal code, destination postal code, invoice number, order number, item product code, item description, item commodity code, item quantity, item unit of measure, item extended amount, freight amount, and duty amount, among others. Checkout application 195 includes the "Create Checkout" function 263, "GetCheckoutStatus" function 269 and "Checkout" 267 function. Each merchant is issued an application ID, a merchant ID, and a merchant passcode (token). The application ID identifies the merchant calling application 152 associated with the merchant (caller). The merchant ID and merchant token belong to the merchant that provides the product and are used to identify where the payment will be transferred (payee). In most cases, the caller and payee are the same party. In cases where the "My Store" 124 carries products from more than one merchant, the application ID and merchant ID are different. The association of the merchant ID, merchant token, application ID is stored in the data in Table 171, shown in FIG. 1A. Table 171 may also include the Callback Url, Return Url, and Cancel Url associated with the merchant specified in the checkout request. The Callback Url, Return Url, and Cancel Url are hosted either in a separate merchant server 270 or the commerce gateway server 110. The "Create Checkout" request 263 includes the application ID, merchant ID, merchant token, merchant "Callback Url", merchant "Return Url", and the rest of the above mentioned transaction data. The "Create Checkout" request 263 also sets up and captures the location of the mobile phone. The mobile phone location is determined via a global positioning system (GPS), an Internet Protocol (IP) address, or triangulation. The "CreateCheckout" request also sets up and collects the computing device type, phone number, device identifier, international mobile equipment identity (IMEI), network service subscriber identifier or international mobile subscriber identity (IMSI). The "CreateCheckout" request also sets up and collects data for calculating tax based on address postal code. The "CreateCheckout" request also sets up and collects consumer risk level data and the checkout application 195 sends the consumer risk level data to the merchants 104, 102 via connections 520.

Figure 5B:
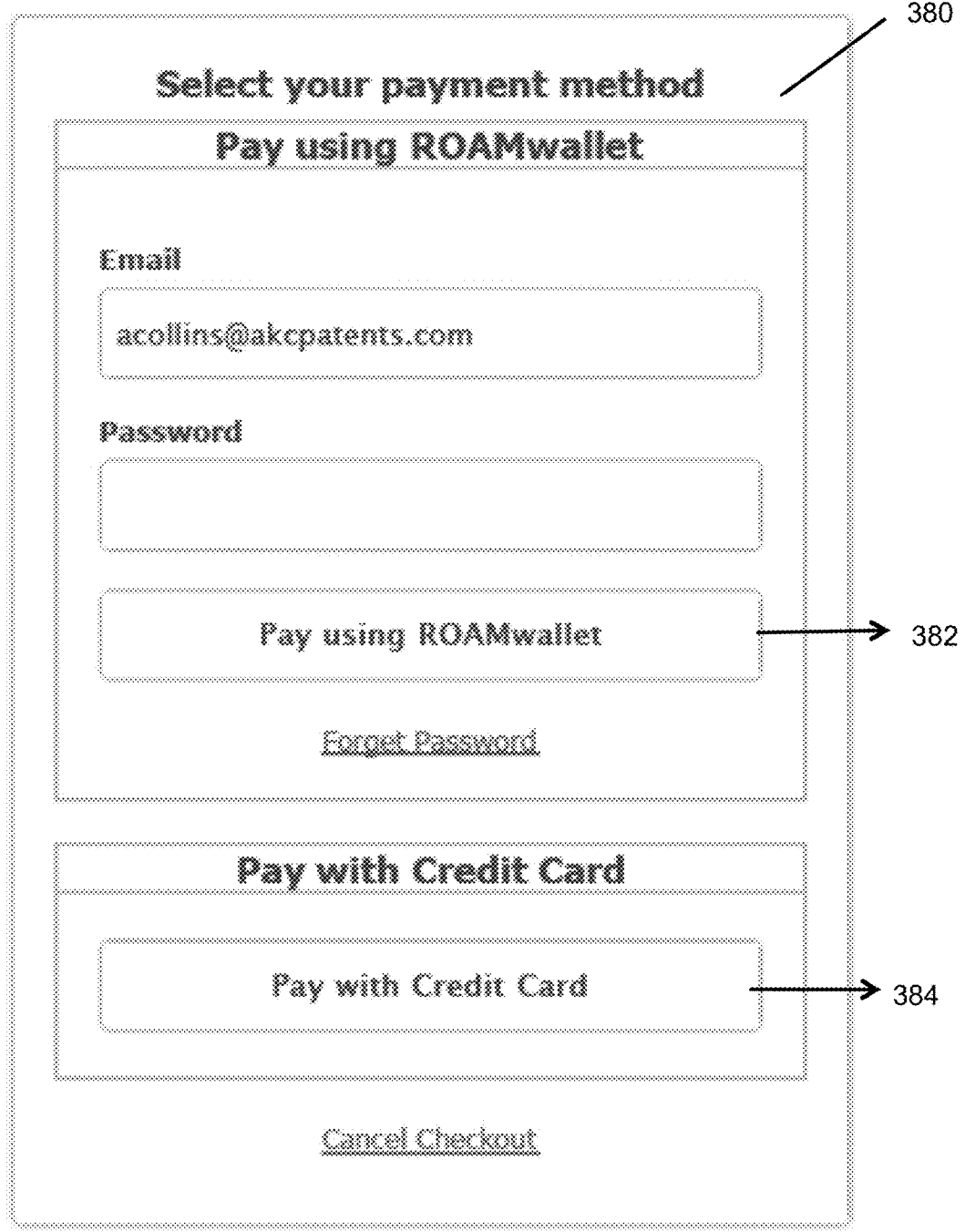
FIG. 5B depicts a screenshot of the payment checkout interface in the commerce checkout systems of FIG. 1A-FIG. 1C for selecting a payment instrument.
Figure 6:
FIG. 6 depicts a screenshot of the payment checkout interface in the commerce checkout systems of FIG. 1A-FIG. 1C providing confirmation of payment.

Next, the "Create Checkout" function 263 initiates a connection to the commerce gateway server 110 and starts the checkout application 195. Checkout application 195 issues a transaction token (or transaction ID) 264, which is then transmitted back to the calling application 152. In the next step 254, the 'Checkout" request 267 directs the checkout application 195 to the checkout page 380, shown in FIG. 5B, for carrying out the payment transaction. The customer ID information, password, and their payment information are retrieved either directly 384 from the consumer or from their registered user account or e-wallet 182 and then are captured by a secure webpage hosted on the commerce gateway server 110. The checkout application may also prefill checkout forms with the stored e-wallet data. The payment transaction is then executed by one of the payment processors 163, 164, 165, and the payment transaction results are posted in the merchant Callback Url specified in the "Create Checkout" request 263. In the embodiment of FIG. 3, the Callback Url is hosted in a separate merchant server 270. In the next step 256, the merchant application 152 inquiries the commerce gateway server 110 about the transaction status by issuing a "GetCheckoutStatus" request 269 for the specific transaction token, and then the transaction results are transmitted and displayed to the customer in the calling application 152. The displayed results 268 include the transaction ID, the payment amount, and a message indicating whether the transaction is approved ("Approved", shown in FIG. 3 and FIG. 6) or not ("Declined", or "Failed", shown in FIG. 7), or pending ("Pending", or "Retry", shown in FIG. 8). Alternatively, the calling application 152 redirects the browser to the ReturnUrl hosted in the merchant server 270, as specified in the request.

CreateCheckout Function

The CreateCheckout function 263 is used to set up all the parameters about a transaction in the checkout process. In one example, the transaction parameters include all level 3 credit card processing parameters including transaction amount, date, tax amount, customer code, merchant postal code, tax identification, merchant minority code, merchant state code, ship from postal code, destination postal code, invoice number, order number, item product code, item description, item commodity code, item quantity, item unit of measure, item extended amount, freight amount, and duty amount, among others. A transaction token 264 is returned and this token is used to reference this transaction in all subsequent operations. A checkout can contain multiple products as long as the payment is made by a single customer to a single merchant. Also, the products must be shipped to the same shipping address.

A list of parameters is specified by using an identification index. The index starts from 0 and increases by 1 for the next item. The index does not skip over values, because items after the skipped values are ignored. A list can be nested and then a second index is provided. For example, to specify a product name, use Product_0_Name for the first item and Product_1_Name for the next. To specify a product attribute name of Product 0, use Product_0_Attribute_0_Name. Tax is also calculated by the checkout application 195 based on the shipping address.

GetCheckoutStatus

The GetCheckoutStatus 269 function is used to check the status of a transaction of the checkout. All returned parameters are optional depending on the availability of that piece of information. The same set of parameters is also posted to the CallBackUrl, if specified in the CreateCheckout request. The presence of all response parameters is conditional depending on the transaction result unless otherwise stated.

Checkout Page

The Checkout request 267 is used to carry out the actual payment. The theme settings of this page including logo, colors of elements, etc, can be configured via the application profile tied to the AppID. The merchant application 152 redirects the browser control to this page by either GET or POST.

Callback

The result of the transaction is posted back to the CallbackUrl as provided in the CreateCheckout request 263. After the transaction is completed, successfully or not, the page is redirected to ReturnUr. At the ReturnUrl page, the merchant displays the transaction result to the customer based on the status from the callback or result from a GetCheckoutStatus call.

Figure 7:
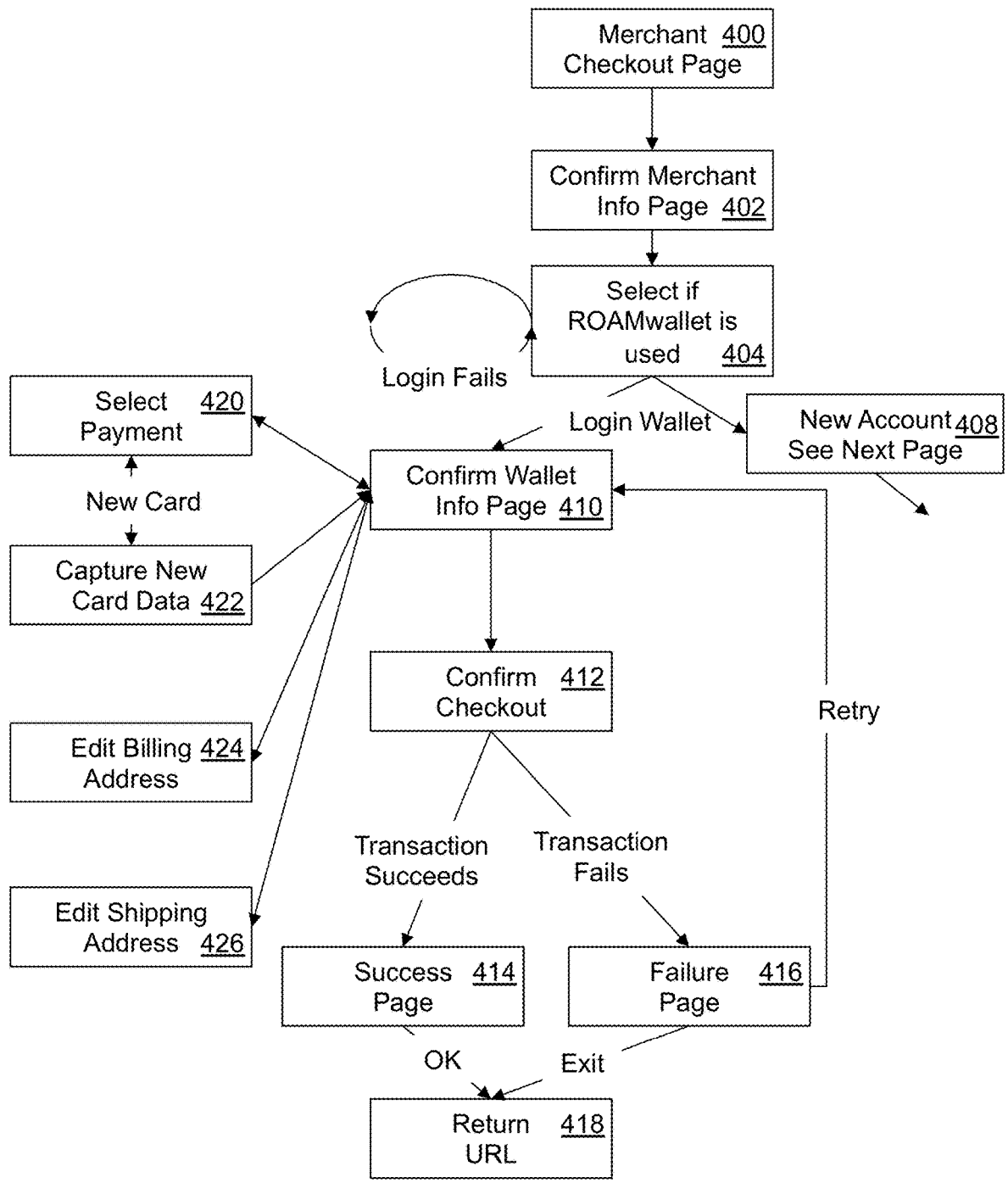
FIG. 7 is a flow diagram of the checkout process with the commerce checkout systems of FIG. 1A-FIG. 1C and with a stored electronic wallet.

Referring to FIG. 7, the checkout process with an e-wallet includes the following steps. First, the merchant checkout page 374 for completing a specific purchase transaction is selected (400), and then the merchant information is confirmed (402). Next, the user selects the payment method (382 or 384) for completing the purchase transaction. If the user selects an electronic wallet (i.e., Roam-wallet) for completing the payment transaction (404), the user is asked to log into their account, confirm the e-wallet information (410), select a specific payment instrument that is stored in the e-wallet for (420) and confirm the checkout (412). If the payment transaction is successful, a success confirmation page is shown (414). If the payment transaction fails, a failure confirmation page is shown (416). The user has the option to login and edit the stored e-wallet information, which includes payment card information, adding or removing payment cards (422), adding or removing payment accounts, editing billing and shipping address (424, 426), among others.

Figure 8:
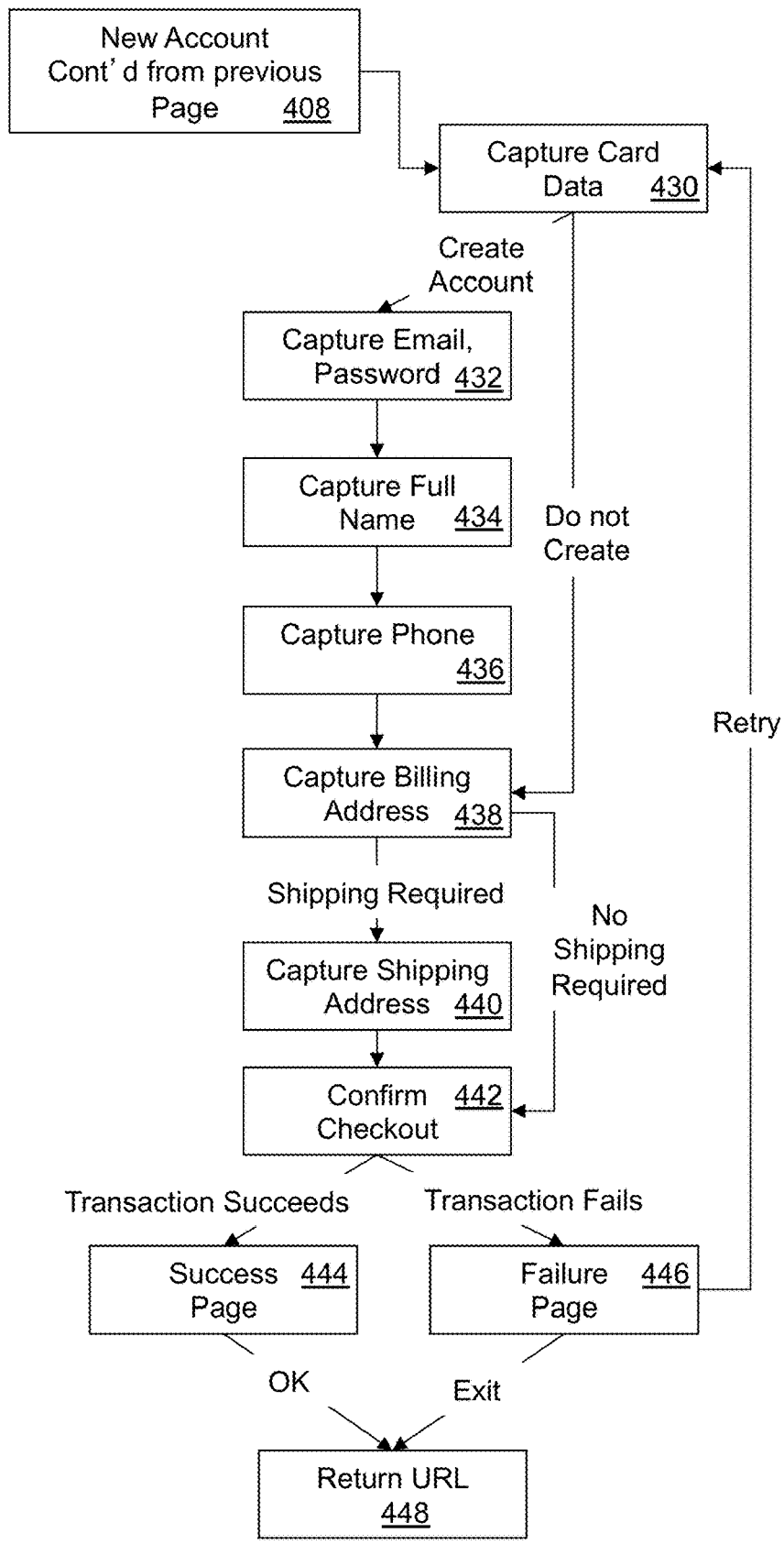
FIG. 8 is a flow diagram for setting up a new user account in the commerce checkout systems of FIG. 1A-FIG. 1C.

Referring to FIG. 8, the process for setting up a new e-wallet account includes the following steps. If the user selects an electronic wallet (i.e., Roam-wallet) for completing the payment transaction (404) and the user does not have a previously set e-wallet account (408), the user is asked for the payment card information (430). After capturing the payment card data, the system asks the user if he wishes to create an account or not. If the user wishes to create an e-wallet account, the user's e-mail address and password are captured (432). Next, the user's full name (434), phone number (436), billing address (438), shipping address (440) are captured and then the checkout is confirmed (442). If the payment transaction is successful, a success confirmation page is shown (444). If the payment transaction fails, a failure confirmation page is shown (446). In the case where the user does not want to create a new account, the billing address (438) and the shipping address (440) (if needed) are captured and then the checkout is confirmed (442).

Figure 9:
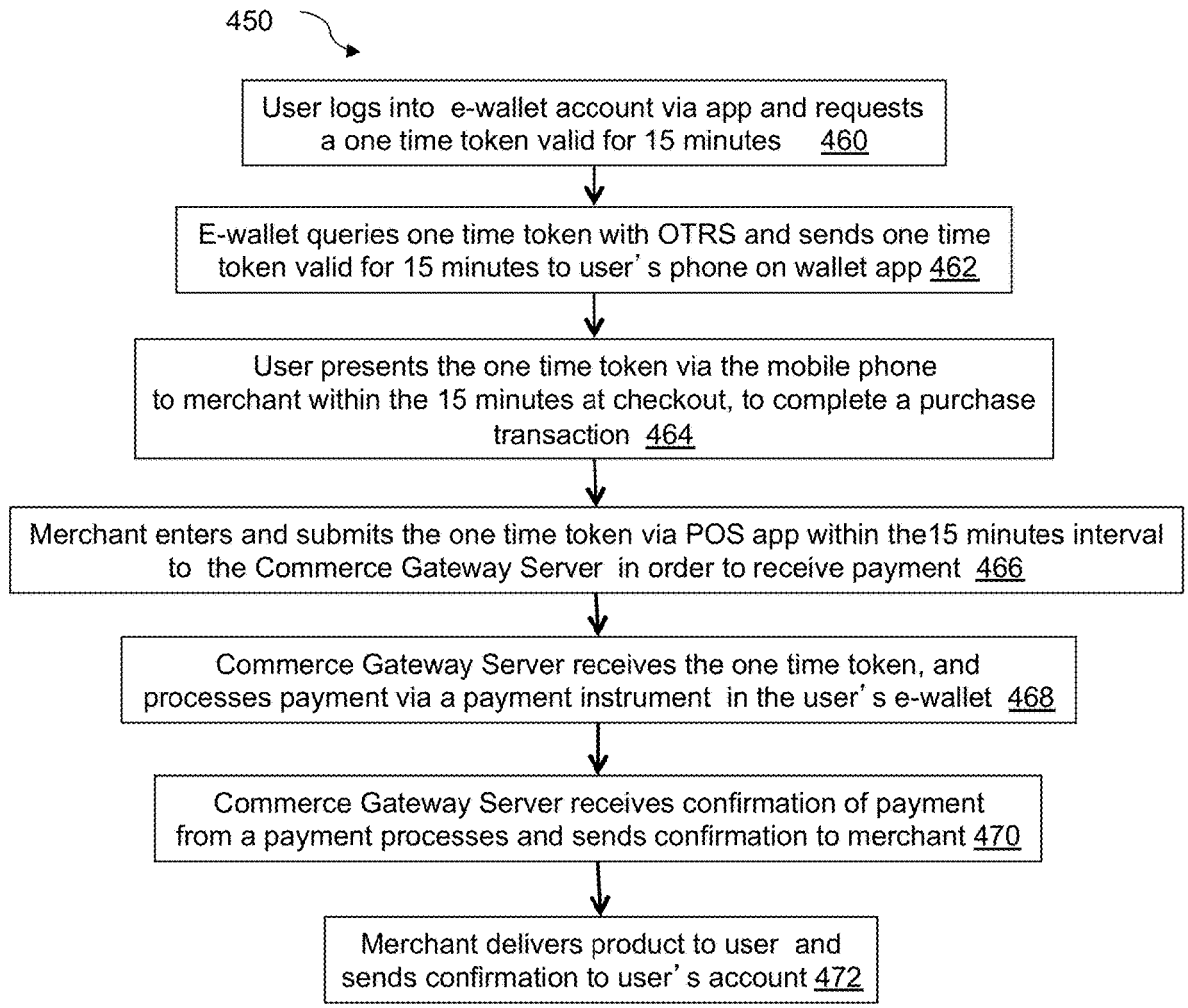
FIG. 9 is a flow diagram for using an e-wallet account to pay with a one-time token.

In some embodiments, a consumer uses a one-time-token generated via his own mobile phone wallet application for completing a purchase transaction at a merchant' site or in a point-of-sale (POS) device. Referring to FIG. 9, and FIG. 1B, a user accesses his e-wallet account 182 in the commerce gateway server 110 via his mobile phone 132. The user logs into his personal e-wallet account via his mobile phone wallet application 533 and requests a one-time-token valid for a short period of time, i.e., 15 minutes (460). This request may require authentication using a PIN number. The commerce gateway server 110 which includes the e-wallet system 182 and a One-time-Token Redemption System (OTRS) 530, sends a one-time-token valid for 15 minutes to the user's phone 132 (462). The one-time-token is linked to the user's e-wallet account and to a specific payment instrument listed as default or specifically selected. The user presents the one-time-token via the mobile phone to the merchant 130, within the given time interval of 15 minutes to complete a purchase transaction (464). The merchant 130 submits the one-time-token within the 15 minutes time interval to the commerce gateway server 110 in order to receive payment (466) via the POS application 120 on merchant device 102. The commerce gateway server 110 receives the one-time-token and processes payment via the payment instrument specified in the user's e-wallet 180 (468). After receiving payment confirmation from a payment processor 163, the commerce gateway server 110 sends confirmation of the completed payment transaction to the merchant 130 (470). Finally, the merchant 130 provides or delivers the product to the user and then sends confirmation to the user's account (472).

Figure 10:
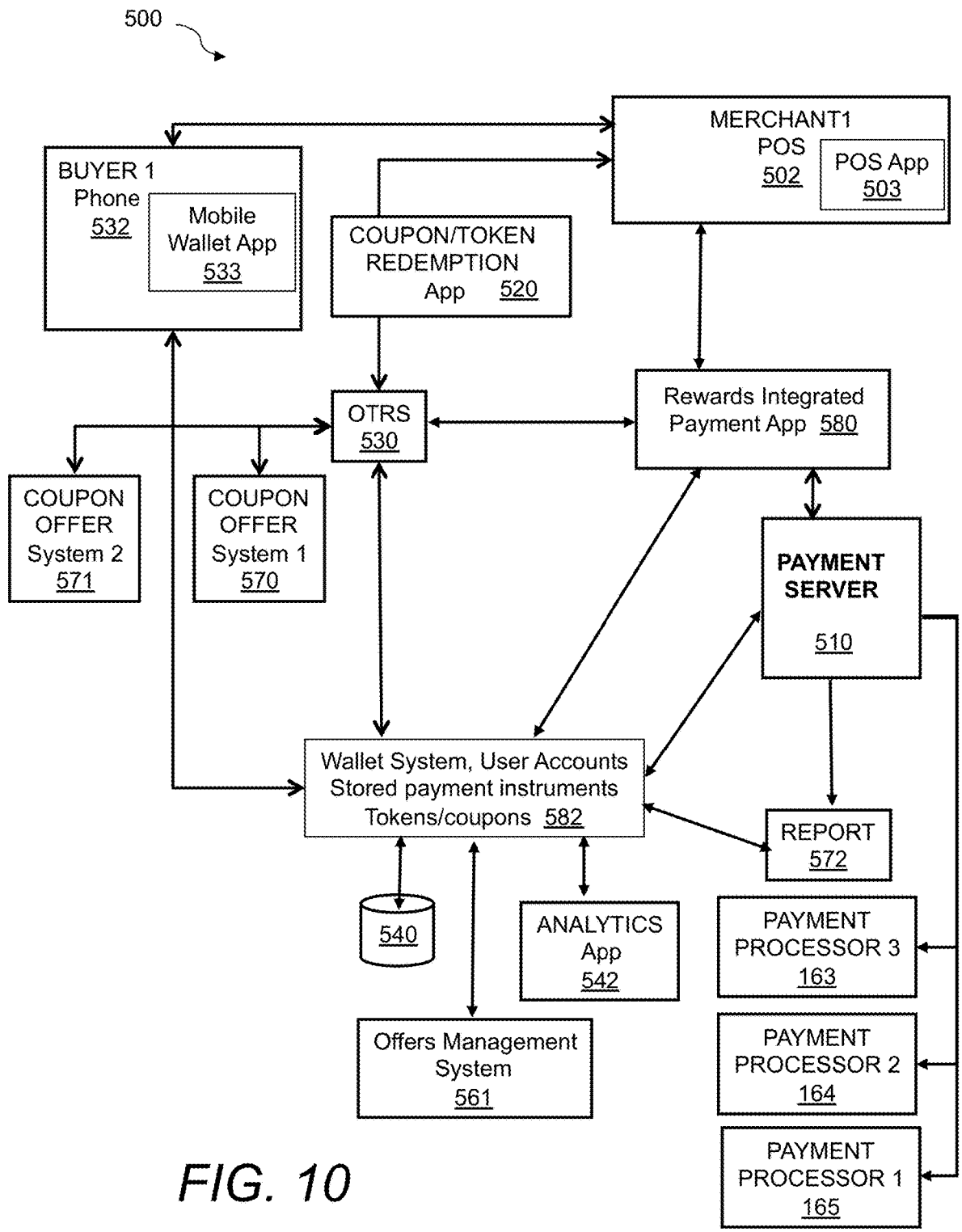
FIG. 10 is an overview diagram of a commerce checkout system incorporating one-time-tokens, coupon and reward systems into merchant point of sale (POS) checkout systems.

In another embodiment, the invention features a commerce platform 500 with a POS card payment application combined with a token redemption application for third party tokens and discounts on the same device, as shown in FIG. 10. Merchants use this device to access the token redemption system in conjunction with, or independent from, the payment card acceptance system, with appropriate reporting and reconciliation done for the merchant on the commerce platform.

Referring to FIG. 10, commerce platform 500 includes a merchant POS 502, a POS application 503, a server side rewards integrated payment application 580, a payment server 510, payment processors 163, 164, 165, electronic wallets 582, a coupon/token redemption application 520, a One-Time-Token Redemption System (OTRS) 530, and external third party coupon offer systems 570 and 571. The commerce platform also includes a database 540 storing all user account/e-wallet information, a reporting system 572, an offers management system 561, and an analytics application 542.

Use Case with Mobile Wallet One-Time-Token Redemption System:

In one embodiment, buyer 1 conducts a purchase transaction with merchant 1 and wishes to pay with the payment instruments, and/or tokens, and/or coupons that are stored in the buyer's electronic wallet 582. In one example, the buyer 1 wishes to pay via a one-time-token generated by his/her wallet application 533, according to the one-time-token process 450 shown in FIG. 9. Referring to FIG. 9 and FIG. 10, buyer 1 logs into his personal e-wallet account 582 and requests a one-time-token valid for a short period of time, i.e., 15 minutes for example (460). The wallet system 582 generates a request for a one-time token to the One-Time-Token Redemption System (OTRS) 530 and passes the parameters of the token, i.e., identifier of user's wallet account, expiration time, and amount, among others. Once the wallet system 582 receives a token from OTRS 530, it sends the one-time-token valid for 15 minutes to the user's phone 532 and wallet application 533 (462). The user presents the token via the mobile phone 532 and wallet application 533 to the merchant POS 502 and POS application 503, within the given time interval of 15 minutes to complete a purchase transaction (464). Merchant 1 sees that user 1 wants to use his wallet application token to pay, and captures the token from the buyer 1 mobile phone 532 with the POS 502 and POS application 503. POS 502 transmits the payment transaction information (including Merchant ID (MID), payment amount, tip, tax amount, and payment token number) to the payment application 580. The payment application 580 recognizes that this payment is using a one-time-token request rather than standard credit card payment, and queries the OTRS 530 about the validity of the token. If the token is neither used nor expired, it is considered to be a valid transaction token associated with an e-wallet account, and the transaction is sent to the e-wallet 582 for processing. From here the wallet system 582, processes the payment request based on amount, MID and utilizes the payment instrument selected by the wallet user for payment. The wallet system 52 retrieves the payment instrument information which is stored in encrypted form, and then passes the payment request to payment server 510, with the payment instrument information which was decrypted from the stored wallet account database in 540. The payment server 510 sends payment request to one of the payment processors 163, 164, 165 (which may be credit card, prepaid debit, ACH or other transaction processors), and receives a response for the payment. If the payment is good, response is provided by the payment server 510 back to wallet system 582, to complete the transaction and record it in reporting 572. Wallet system 582 then sends a response to OTRS 530 confirming that the transaction is complete. In the case where the payment fails, an error message is passed to the OTRS. The presented token in OTRS is then marked as "now used", and the OTRS transmits the token validity confirmation and transaction completion message back to the merchant POS 502 via the payment application 580.

Use Case with Third Party Coupon Redemption in POS:

In another example, buyer 1 wishes to redeem a third party coupon or voucher using the same POS system that is used for payment acceptance. The third party coupon/token may be in the form of printed coupon with barcode and/or numbers, or in the form of a mobile application displaying a barcode and/or a number. In other examples, the third party coupon/token may be stored on an NFC chip to be transmitted via NFC or Bump, and in some cases the token may even be stored in the user's e-wallet account. In this example the transaction is done via paper for mobile application presenting the third party coupon in barcode or number. The third party coupon systems 570, 571 that generate the coupons are tied to the OTRS 530 via an Application Programming Interface (API), and can validate coupons that come from the merchant POS applications 503 and 580. The third party coupon/token is presented by buyer 1 to the merchant at the time of checkout. Merchant 1 first rings up the total sale amount including tip, and tax, on the POS 502, and then captures the coupon by any number of means including keying or scanning a barcode, along with the amount of payment, and presents the coupon, along with the payment amount, and merchant ID (MID) to the payment application 580. Payment application 580 recognizes the coupon request and sends the request, payment amount and MID to the One-Time-Token Redemption System (OTRS) 530. OTRS 530 checks if the coupon is used, or expired in order to verify the validity of the coupon. The checking may be done via a copy of the third party coupons stored on the OTRS 530, or it can go straight to a third party coupon system 570 via the OTRS API. Once the coupon is verified as good, it is marked as "used" by the coupon system 570. The user information or buyer of the coupon's information may be passed back to the payment application 580 for reporting purposes back to the merchant. If the coupon is used or expired, an appropriate error message will also be sent to the payment application 580 to be transmitted back to the POS 502. Assuming the coupon is valid and redeemed, the payment application 580 then deducts the total amount of the coupon or voucher from the total transaction amount and presents the amount required to be paid, if any, on the POS application 503 for further transactions. If the voucher amount is greater than the total transaction amount then the bill is zero or negative. At that point, buyer 1 may choose to pay the remainder of the transaction amount with cash or another form of payment including credit card or e-wallet. The remainder of the transaction is processed as any other payment transaction would be. If buyer 1 pays with credit card then the payment application 503 would swipe the card and send request to payment application 580 and then to the payment server 510. The payment server 510 then sends payment request to a payment processor 163, 164, 165 (which can be credit card, Prepaid Debit, ACH or other transaction processors), and receives response for the payment. If the payment is good, a response indicating a successful payment is provided by the payment server 510 and a transaction completion message is sent back to the merchant POS 502 via the payment application 580. Transactions are recorded on reporting system 572 including any user data received from third party coupon system 570 as mentioned above. The transaction report may also be sent back to the third party coupon system 570 via the OTRS 530 through its associated API.

Figure 12:
FIG. 12 is a picture of the merchant POS system of FIG. 10.
Figure 13:
FIG. 13 is a screenshot of the POS application depicting the total sales amount.
Figure 14:
FIG. 14 is a screenshot of the POS application depicting the process of scanning a coupon/voucher barcode.
Figure 15:
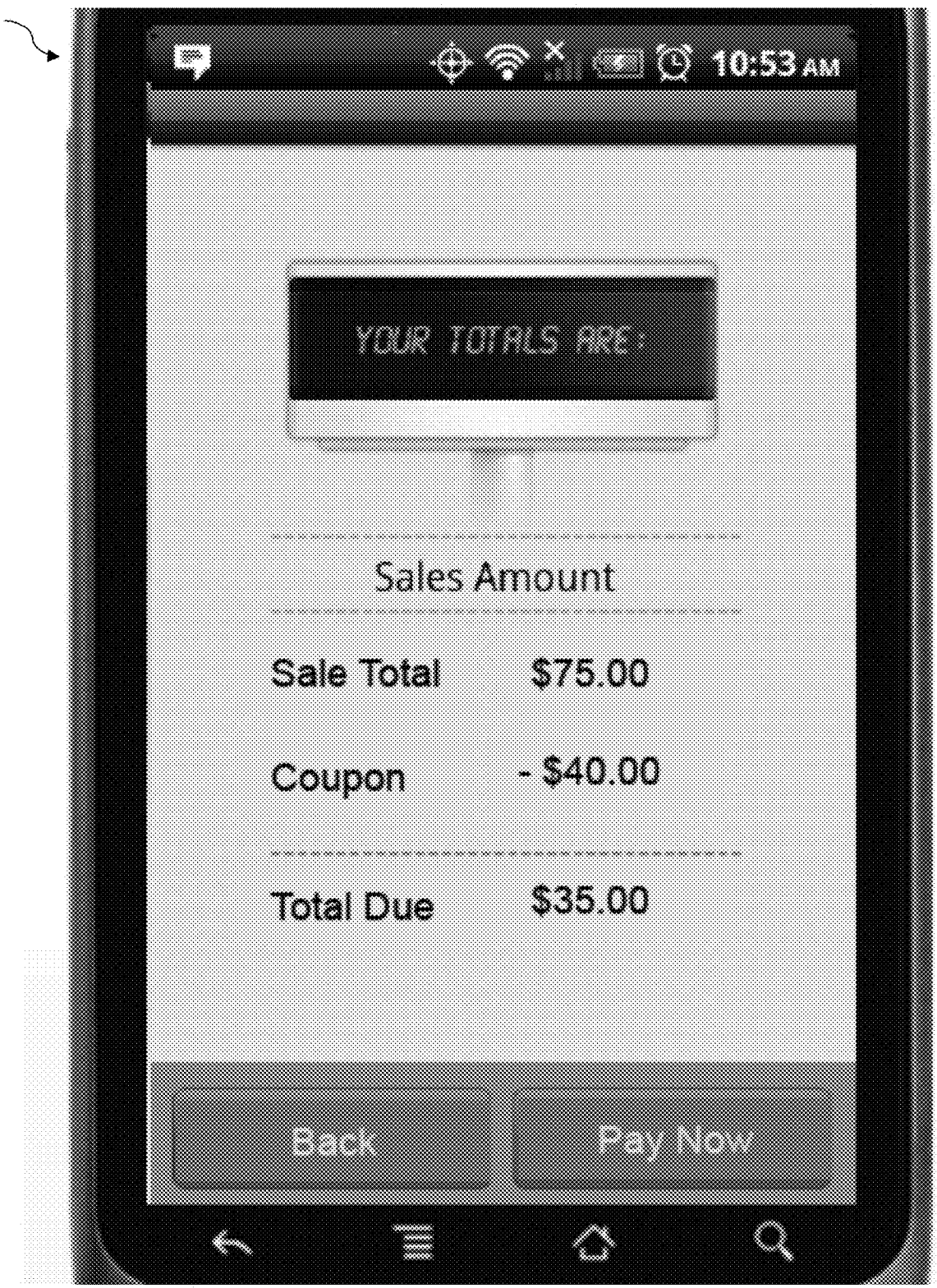
FIG. 15 is a screenshot of the POS application depicting to total sales amount minus the entered coupon.
Figure 16:
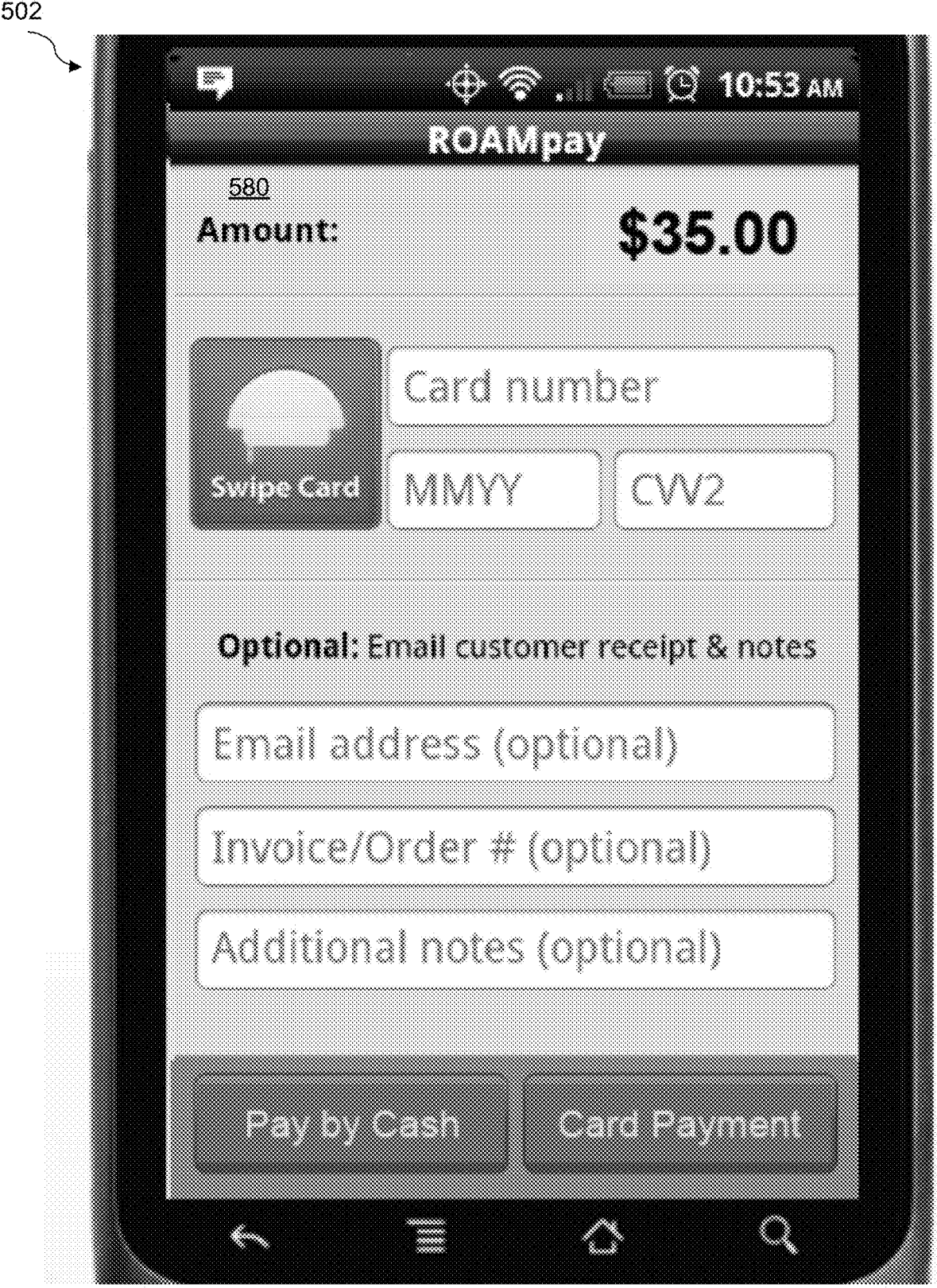
FIG. 16 is a screenshot of the payment application depicting the capturing of the payment card data.
Figure 17:
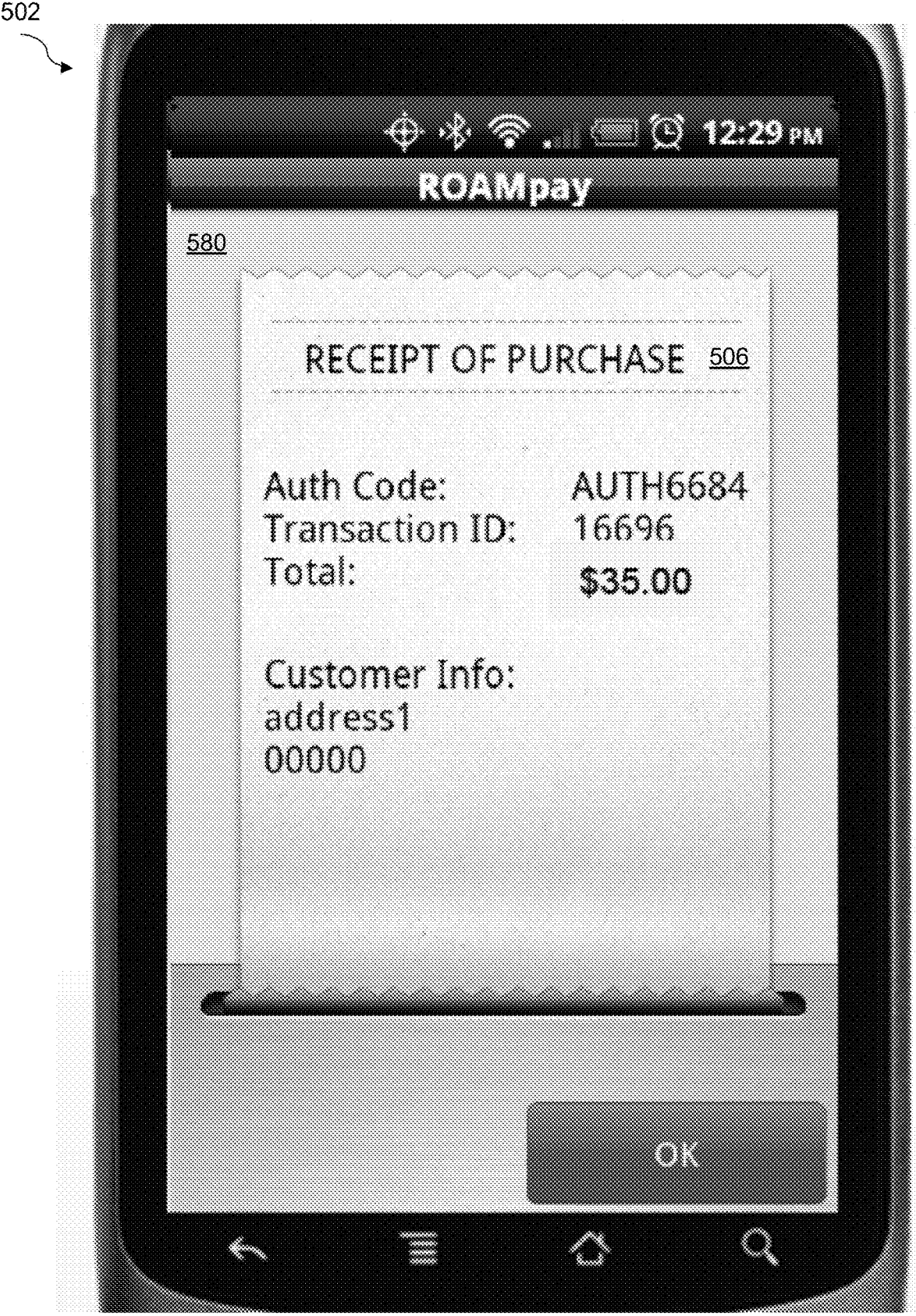
FIG. 17 is a screenshot of the payment application depicting the purchase receipt.
Figure 18:
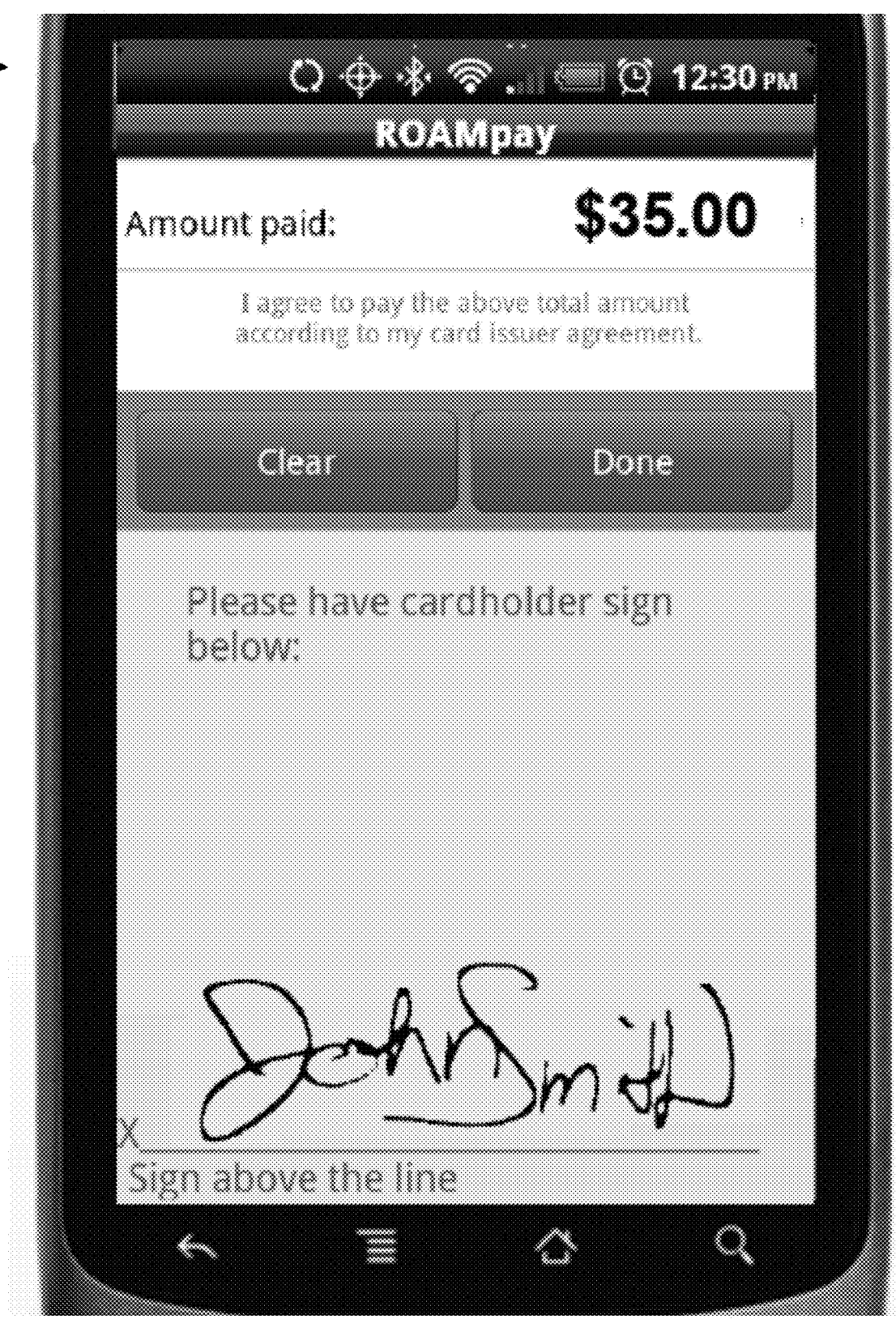
FIG. 18 is a screenshot of the payment application depicting the signing of the credit card receipt.

In one example, a consumer prepays $20.00 for a $40.00 voucher to a third party coupon provider 570 for a coupon for a particular restaurant, and prints the voucher on a piece of paper. Next, the consumer eats at the particular restaurant at a later time and the check turns out to be $65.00. The merchant uses POS system 502 and POS application 503 to ring up $65.00, as shown in FIG. 12. Next, the consumer adds a $10.00 tip, and the total amount of $75.00 is rung up on the POS application 503, as shown in FIG. 13. The merchant proceeds in the POS application 503 from the "Total Amount" screen to the "Payment" screen, where it has the option to scan and enter any voucher or coupon or token number into the POS via the 'Enter Coupon" field 504, shown in FIG. 13 and FIG. 14. The POS application 503 then passes the voucher number along with the total amount to the OTRS 530, which is linked to third party coupon system 570 to check to see if the voucher is used, or expired. If it is neither used nor expired, it further checks a third party voucher/coupon system 570 (such as Groupon) via the platform through an API to see if the voucher is still valid on the third party's system. If the voucher has not been used and has not expired, the voucher is marked by the third party system 570 as "now used", and system 570 replies to the OTRS 530 via the API. The voucher/coupon system 570 may also return voucher buyer's name, email and phone number back to the OTRS 530. The OTRS 530 then marks the voucher as "used" (if it maintains a copy of the vouchers on its own database), the amount of the voucher is then deducted from the total amount and returned back to the POS application 503 for further payment processing. The merchant sees that the voucher has been accepted and the total amount is now $35.00 ($75.00-$40.00), as shown in FIG. 15. Next, the POS 502 asks how the consumer would like to pay. The answer is typically "cash" or "credit card". If cash is used, the total amount of cash is entered, the change is shown, and the transaction is recorded in the POS 502 for the merchant to see later in the reporting system 572, including any data passed by the third party coupon system 570. If credit card is used, then the card is swiped in the Roam swiper 505 (shown in FIG. 12), the credit card information is captured (shown in FIG. 16), and the consumer is asked to sign the receipt, as shown in FIG. 18. The payment transaction is processed by the same POS 502, via the payment application 580, payment server 510 and payment processor 163, as was described above. All associated transaction data are recorded and may be viewed by merchant 1 in reporting system 572, and used for further analysis 542 and to send further promotions to the consumer. The POS system 502 may collect consumer data including name, contact information, e-mail, phone number, address, among others, (shown in FIG. 16) and may send product offers and promotions to the consumers. The POS payment application 580 also collects these consumer data and sends a receipt 506 to the consumer, as shown in FIG. 17. The POS payment application 580 may further send product offers to the mobile wallet application in phone 532 and offers inside the e-wallet account 582.

In another example, a consumer pays $20.00 for a $40.00 voucher for a particular restaurant and stores the voucher in the coupon section of his/her mobile wallet account 582. The consumer is made aware that this particular merchant has a compatible mobile wallet POS system 502 to redeem his voucher that is located in his e-wallet. The consumer eats at the particular restaurant at a later time, the check is $65.00, the consumer adds a $10.00 tip, and the total amount of $75.00 is rung up on the merchant's POS application 503. The merchant proceeds in the payment application 503 from the "Total Amount" screen to the "Payment" screen, where it has two options to pay as an e-wallet account user. In a first option, it uses the payment card already stored in the mobile wallet account 582 ("Swipe Card") and in a second option it uses a one-time-token generated by the mobile wallet application associated with the e-wallet account 582 ("Use Wallet Token").

If a payment card is swiped ("Swipe Card"), the POS system 502 on the payment server 510 side decrypts the card data, extracts the PAN data and does a match for an e-wallet user. If there is a match then it searches for a stored coupon or token (or discount) that matches the MID of the merchant, then applies the coupon/token if not expired or used against the OTRS, and then checks if the coupon is with the third party coupon system 570, as was described above. If the coupon/token is valid, its value is subtracted from the total amount shown on the merchant POS and the remaining amount is charged to the payment card. If confirmed then the payment goes through as was described above. A coupon redemption transaction may or may not be reversed depending on merchant and provider rules.

If an e-wallet token is used ("Use Wallet Token"), a one-time-token is generated by the mobile wallet application 533 by buyer 1 just before the checkout takes place. This requires the wallet user/buyer 1 to access his wallet application 533 on his mobile phone 532 and authenticate himself via password PIN and other mechanisms to generate the temporary one-time-token on the wallet system server 582 which then interacts with the OTRS 530 to create the token on the server side waiting for redemption. The token is tied to wallet users "default" card or payment method selected. The user may also set any transaction limits, and indicate if he wants to share his contact information with the merchant he is about to transact with. The token is scanned or entered into the POS application 503 by the merchant and passed to the OTRS for validation. The OTRS checks if the token is valid, it pings the wallet system 582 to check if there are any other coupons or discounts to be applied for this Merchant ID, it checks if there is a coupon from a third party, or from the merchant itself, it then checks the validity of these coupons and discounts and applies the coupons and discounts and returns to the POS the remaining amount to be paid for confirmation. Once the merchant confirms with the consumer, then the remaining amount is charged to the consumer's default payment method, which may be a credit card stored in the e-wallet 582. Once the payment transaction is complete, the POS application 503 is notified, an email receipt is automatically sent to buyer 1 and shows up in the mobile wallet application 533. The receipt may be also texted to buyer 1 as well. Merchant 1 receives all appropriate reporting about the transaction and the buyer 1 in the backend reporting system, and if the consumer/buyer agreed to it, merchant 1 can later send offers and deals to the consumer's e-wallet application 533 in the Deals/Coupon section.

The One-Time-Token Redemption System (OTRS) 530 captures and passes to the wallet system a one-time-token previously generated by another system. The token is checked for validity, expiration and if it has been used or not. A token can be generated by a consumer wallet system or by a third party coupon/voucher system 570. In the case of the consumer wallet system, the token generation is initiated by a consumer via the mobile wallet application 533 for the purpose of processing a payment. In the case of the coupon/voucher system 570, a token is generated by the coupon or voucher system 570 for the purpose of redeeming such a coupon/voucher for value, or the OTRS can simply be tied to a third party coupon system 570 that does the authentication of the voucher without the OTRS keeping a copy of the token or needing to generate a token separately.

Figure 11:
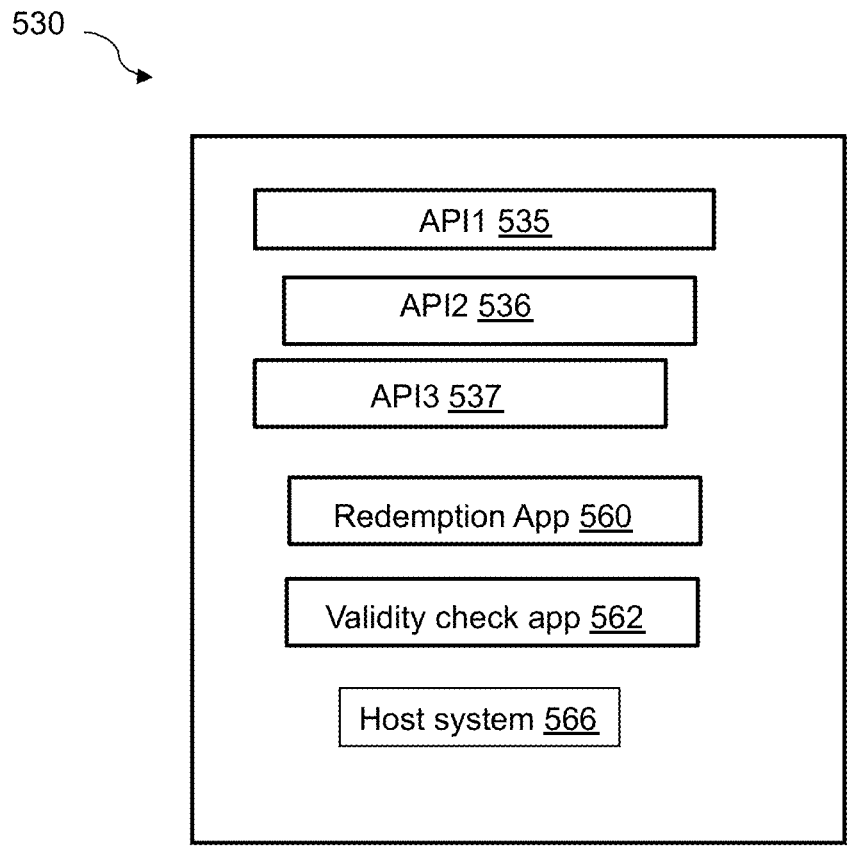
FIG. 11 is a block diagram of the One-Time Token Redemption System (OTRS)

Referring to FIG. 11, the OTRS system 530 includes a host system 566, a set of APIs 535, 536, 537, that allow external coupon systems 570 or payment systems to tie to the redemption system, a redemption application 560 that can sit on various devices, a validity check system 562 to show if the token is valid (not timed out, or used), and to further check the payment system or coupon system to either process the payment, or process a coupon. The type of token can be categorized for different purposes. The APIs between OTRS 530 and coupon systems 570 may include a query for token authentication and use including Merchant ID, and Token ID. Only registered merchants that are associated with that coupon can "redeem" the coupon. User information (i.e. buyer of the coupon) may be passed back to OTRS 530 from coupon system 570 for reporting purposes back to the merchant. Upon completion of the transaction, reporting of the transaction amount, tip, tax, type of payment and any level three data are passed back to the coupon system 570 via the APIs. Additional information may be passed via OTRS back to the coupon system provider 570, such as if the same buyer identified via the card number used or e-wallet account used, comes back to the same merchant and does a transaction without using a coupon, this tracks effectiveness for repeat business. There may be a boarding process required to associate a merchant on the OTRS 530 with a merchant on the third party coupon system 570. This boarding process matches the Merchant ID in the OTRS to an ID in the third party coupon system, such that this merchant can only redeem its own coupons and not those of other merchants. The OTRS may be tied to a standalone coupon redemption application that is not tied to a POS app for the sole purpose of authenticating and redeeming a coupon or token tied to the system.

When the merchant initiates a payment token transaction in its POS application 503, the following information is passed via the POS application to the system: merchant identifier registered to the system, the token presented by the user on his mobile wallet application, the total amount of the transaction, any level three data about the purchase if applicable, and location of the POS device 502, if applicable. The token information may be keyed, scanned in via barcode, (shown in FIG. 14), or captured using NFC or other means. Then the system checks to see if the token is still valid. If the token is invalid (no match, expired or used) it immediately responds to the POS application with the appropriate error message to decline the transaction. If the token is valid, then the token is matched to an e-wallet user, and the system checks a discretionary field entered by the consumer when he/she created the token to indicate maximum amount authorized. The amount being charged by the merchant should be equal to or less than the maximum authorized amount. If this is not the case, an error message is generated and sent back to the redemption application, but the token remains valid for another transaction for the valid amount. If the amount is within the authorization limit (which may not be set at all by the user if the field is empty), then the transaction behaves very similar to that passed by the e-wallet checkout API where a consumer has validated its account and the "default" payment instrument, selected at the time of token generation, will be used to authorize the transaction amount. The actual payment is then processed and if the transaction is approved, the merchant will see a proper response on the redemption application 560 and payment application 580, and funds would be settled by the merchant's processor to its account. Next, receipts will be sent to the consumer via email or text, and stored in its wallet account. The token is then marked as "used" and cannot be used again. If the payment transaction is declined by the processor, an appropriate message is sent back to the redemption application 560. The merchant receives the appropriate reporting through its report support portal where it can see the transactions. For those consumers opting in to share email and demographic information for future promotions they can check a box during token generation and their contact info will be shared to the merchant via the reporting system 572.

When the merchant initiates a coupon transaction in its POS application 503, the following information is passed via the POS application to the system: merchant identifier registered to the system, the coupon presented by the user on his mobile wallet application or on a printed piece of paper in the form of a number of barcode and location of the POS device if applicable. The coupon information may be keyed, scanned in via barcode, or captured using NFC or other means. Then the system checks to see if the coupon is still valid. If the coupon is invalid (no match, expired or used) it immediately responds to the application with the appropriate error message to decline the transaction. If the coupon is valid, it matches the coupon provider (like a wallet user who generated the token), and then via the coupon API informs the coupon provider this merchant is redeeming this particular coupon. Next, if it matches the coupon provider's records as a valid coupon, the coupon provider will mark the coupon as redeemed in its system and then notifies the token redemption system via the API, and may pass the consumers information including email back to the redemption system where the reporting is then provided to the merchant via the reporting system 572 as needed. The successful redemption notification via the API causes the redemption system 530 to generate the appropriate response back to the application and cancels the coupon. If for whatever reason the coupon provider sends a negative response, then the appropriate message will be sent to the application, and the coupon will be canceled.

A coupon provider sends coupons into the e-wallets 582 in the following way. When a user uses the e-wallet based checkout application to pay for a coupon, then the system knows that the coupon is tied to the user's e-wallet and deposits the coupon or token into the e-wallet account. The mobile wallet application 533 then pulls up a corresponding coupon or token barcode or digit for the redemption of the coupon or token at the redemption application 560.

Several embodiments of the present invention have been described. Nevertheless, it will be understood that various modifications may be made without departing from the spirit and scope of the invention. Accordingly, other embodiments are within the scope of the following claims.

What is claimed is:

1. A method for using a one-time token from an offer system for completing a purchase transaction at a merchant checkout system, the merchant checkout system having a redemption application and a checkout application, the method comprising:

providing a consumer computing device having an electronic wallet application;

providing a wallet system having a user electronic wallet account that is accessible by the electronic wallet application over a network connection;

providing a redemption system that comprises a validity check application and an API configured to allow the offer system to interface with the redemption application, wherein the redemption system is in operative communication with the wallet system so that the consumer computing device uses the electronic wallet application to access the redemption system and the wallet system;

sending, by the electronic wallet application, a request to the wallet system for a one-time token, forwarding, by the wallet system, the request to the redemption system;

issuing, by the offer system via the redemption system, the one-time token so that the one-time token is valid for a single use and for a specified time interval, wherein the one-time token is linked to the user electronic wallet account and to a specific payment instrument by the wallet system, and wherein the one-time token has an authorized monetary amount for payment by the specific payment instrument designated by a user, receiving, by the electronic wallet application in response to the request, the one-time token from the redemption system, providing, by the consumer computing device, the one-time token to the redemption application in the specified time interval;

checking validity of the one-time token by the redemption application sending the one-time token to the redemption system and executing the validity check application to determine whether the one-time token has expired or matches a previously used one-time token of the offer system;

matching, by the redemption system, the one-time token to the user electronic wallet account and determining if the authorized monetary amount from the user electronic wallet account is sufficient for the purchase transaction; and either (1) sending the one-time token from the redemption system to the checkout application if the one-time token is valid and the matching determines that the authorized monetary amount is sufficient, or (2) transmitting and displaying a failure confirmation page to the consumer computing device if the one-time token is not valid or the matching determines that the authorized monetary amount is insufficient; and processing payment for the purchase transaction via a secure payment application when the one-time token is received by the checkout application.

2. The method of claim 1, wherein the payment is processed using the specific payment instrument.

3. The method of claim 1, further comprising logging in to the user electronic wallet account, and wherein the logging in comprises authenticating a user with a secure personal identification number (PIN).

4. The method of claim 1, further comprising receiving confirmation of payment by the consumer computing device.

5. The method of claim 1, wherein the user electronic wallet account stores payment instrument data, fulfillment data, demographics, loyalty information, and transaction history.

6. The method of claim 1, wherein said consumer computing device comprises at least one device selected from the group consisting of: mobile phone, PDA, payment module, portable computer, personal computer, set-top box, netbook, tablets, iPad, electronic reader, and internet appliance.

7. The method of claim 1, wherein the specified time interval is 15 minutes.

* * * * *